United States Patent

Balding

[15] 3,643,258
[45] Feb. 15, 1972

[54] ELECTRONIC GENERATOR FOR CONTACT AND ANALOG AND COMMAND INFORMATION

[72] Inventor: George H. Balding, Los Altos, Calif.
[73] Assignee: Kaiser Aerospace & Electronics Corporation, Oakland, Calif.
[22] Filed: June 30, 1969
[21] Appl. No.: 841,684

Related U.S. Application Data

[63] Continuation of Ser. No. 378,892, June 29, 1964, abandoned.

[52] U.S. Cl. ............................343/108 R, 73/178 T, 340/27, 343/5 EM, 343/17
[51] Int. Cl. ...........................................................G01s 1/18
[58] Field of Search ................343/17, 108, 108 R, 108 SI, 343/106, 107, 7.9, 7 TA, 6 TV, 5 EM; 73/178, 178 T; 340/27

[56] References Cited

UNITED STATES PATENTS

| | | | |
|---|---|---|---|
| 2,732,550 | 1/1956 | Reedy | 343/108 X |
| 2,931,026 | 3/1960 | Nelson | 340/331 X |
| 2,932,024 | 4/1960 | Sant Angelo | 343/107 X |
| 2,967,263 | 1/1961 | Steinhauser | 343/108 X |
| 3,128,445 | 4/1964 | Hosford | 73/178 T X |
| 3,165,745 | 1/1965 | Pike et al. | 340/27 X |
| 3,237,193 | 2/1966 | Curry, Jr. et al. | 343/108 |
| 3,281,844 | 10/1966 | Sabin | 343/106 X |
| 3,307,191 | 2/1967 | Crane | 73/178 T X |

OTHER PUBLICATIONS

"Single Scope Displays", by A. Schlang et al., Military Automation, Sept.-Oct. 1958, pp. 172-173, copy in 343/112.

Primary Examiner—Malcolm F. Hubler

[57] ABSTRACT

A display system for an aircraft including an electronic generator circuit for generating waveform signals which provide a pointer-marker on a cathode-ray tube, one end of which is normally positioned relative to a fixedly positioned reference mark. Various modes of operation are provided. In the compass mode, selected means provide signals to laterally displace the one end of the marker with deviation of the aircraft heading from a selected heading. In the omni mode, means responsive to the omni signals displace one end of the marker relative to the fixed reference with deviation of the aircraft heading from a selected heading, and effect lateral displacement of a second end of the marker with deviation of the aircraft from a selected track. A "to-from" symbol generator circuit is operative with the marker generator circuit to provide "to-from" information on the display. Crab means provide signals which adjust the pointer-marker on the cathode-ray tube display to the heading to be followed for crabbing purposes.

18 Claims, 65 Drawing Figures

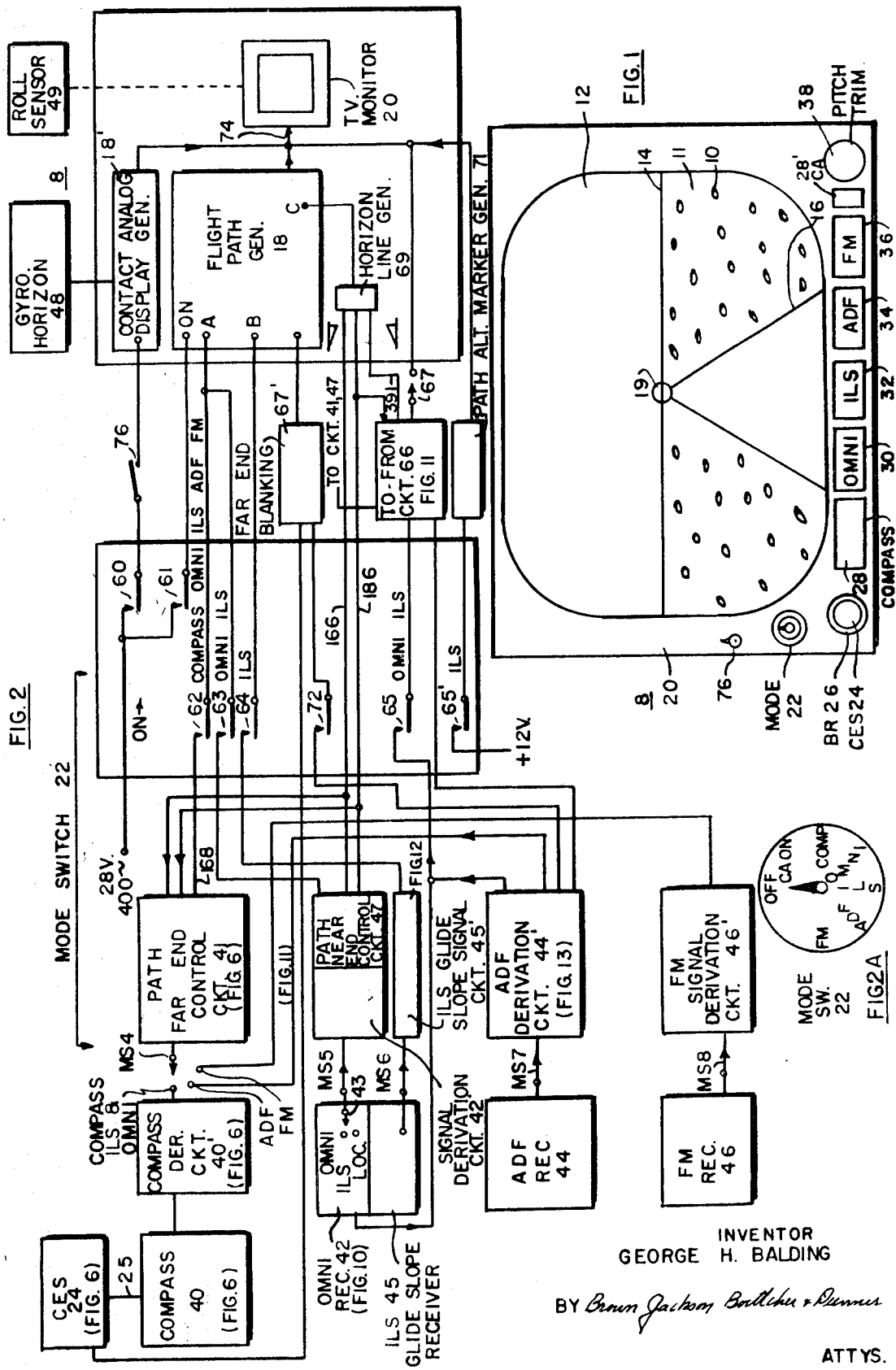

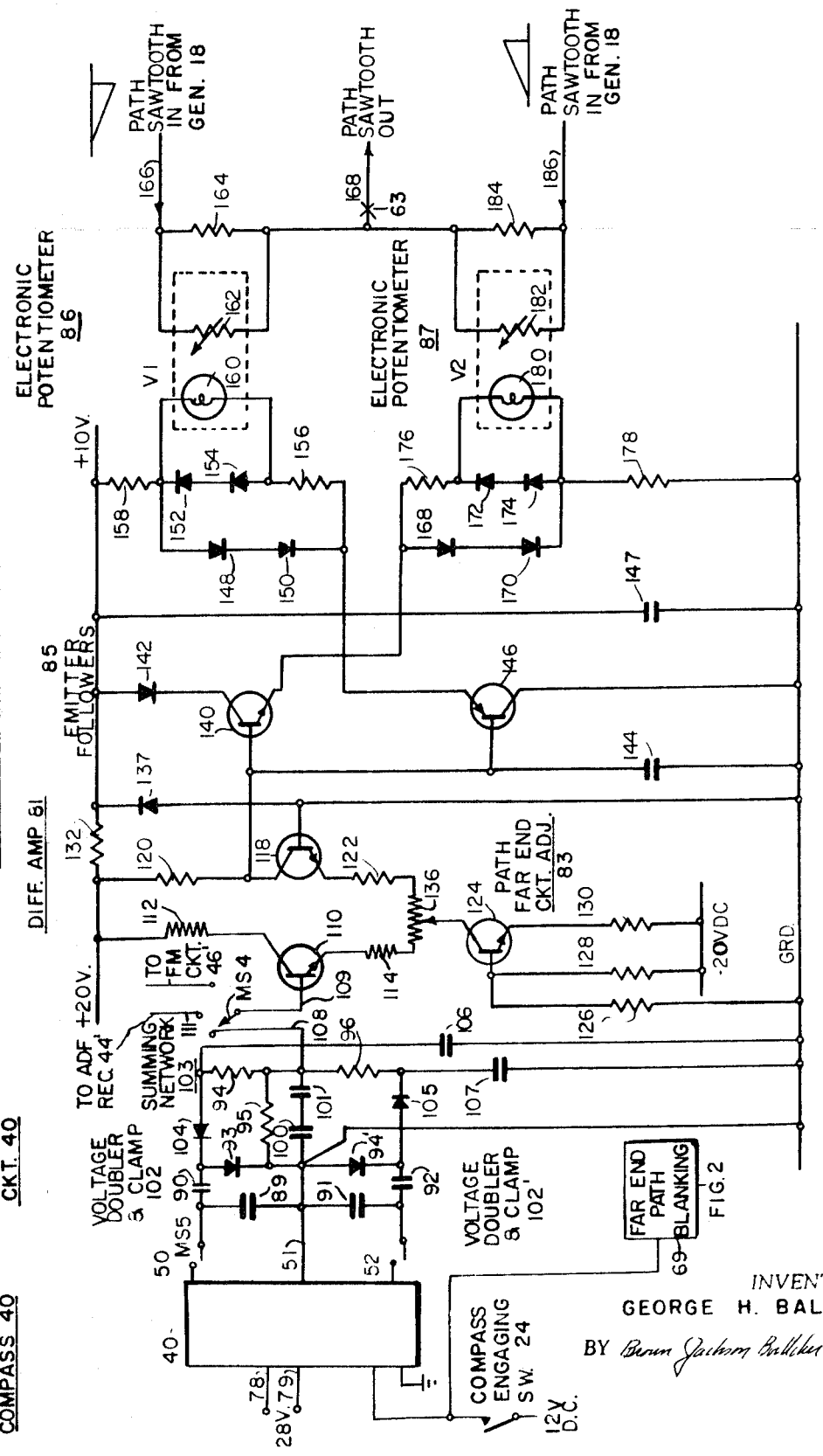

OUTPUT 87    
FIG.6A    FIG.6E    FIG.6I    FIG.6M
OUTPUT 86 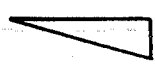  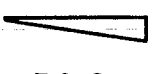 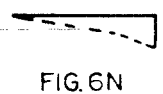
FIG.6B    FIG.6F    FIG.6J    FIG.6N
OUTPUT 168   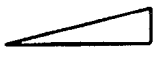 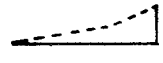
FIG.6C    FIG.6G    FIG.6K    FIG.6O
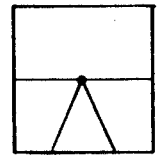 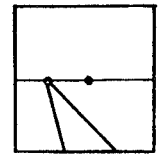 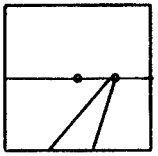 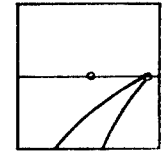
FIG.6D    FIG.6H    FIG.6L    FIG.6P
OUTPUT 209
OUTPUT 208 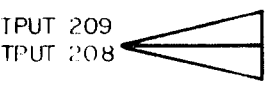 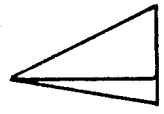 
FIG.10A    FIG.10D    FIG.10G
OUTPUT 298 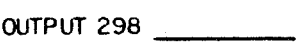  
FIG.10B    FIG.10E    FIG.10H
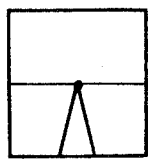 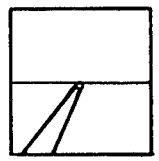 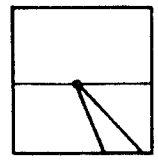
FIG.10C    FIG.10F    FIG.10I
*INVENTOR.*
GEORGE H. BALDING

DISPLAY PRESENTATION DURING OMNI OPERATING MODE

DISPLAY PRESENTATION DURING ILS OPERATING MODE

*INVENTOR.*
GEORGE H. BALDING

DISPLAY PRESENTATION DURING OMNI MODE OF OPERATION
FIG. 8A
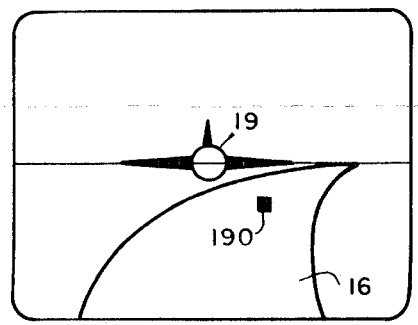
AIRCRAFT ON CORRECT GROUND TRACK BUT INCORRECT HEADING
FIG. 8D
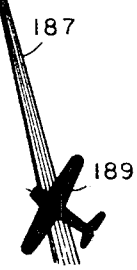
FIG. 8B
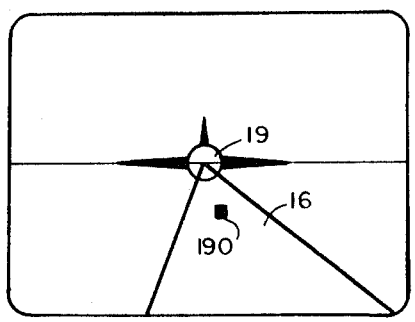
AIRCRAFT ON CORRECT HEADING BUT INCORRECT GROUND TRACK
FIG. 8E
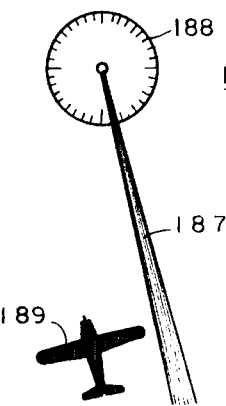
FIG. 8C
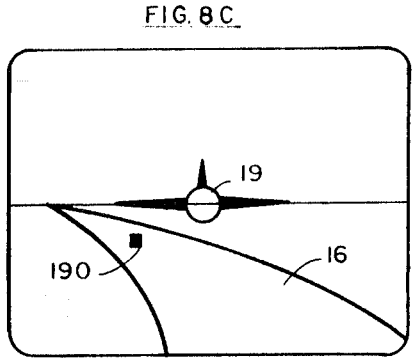
AIRCRAFT ON INCORRECT HEADING AND GROUND TRACK
FIG. 8F
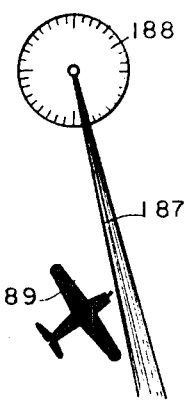
INVENTOR.
GEORGE H. BALDING

ADF SIGNAL DERIVATION CKT. 44'

INVENTOR
GEORGE H. BALDING

BY Brown Jackson Boettcher & Dienner

ATTYS.

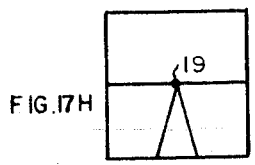
FIG.17H
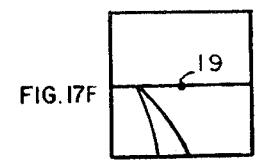
FIG.17F
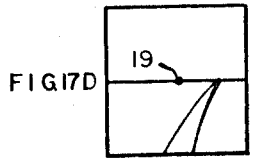
FIG.17D
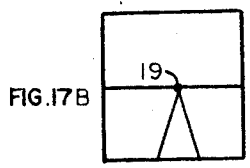
FIG.17B
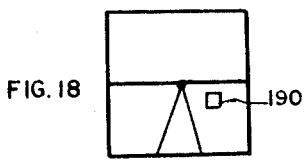
FIG.18

188
FIG.17G

FIG.17A
FIG.16
188
INVENTOR
GEORGE H. BALDING
BY Brown Jackson Boettcher & Dienner
ATTYS.

ELECTRONIC GENERATOR FOR CONTACT AND ANALOG AND COMMAND INFORMATION

This is a continuation of application, Ser. No. 378,892, filed June 29, 1964, now abandoned.

The present invention relates to a visual display system, and specifically to a display system including a novel electronic generator for generating signals to provide a single integrated display on a display device of information relating to different conditions of a mobile unit.

A novel display device known in the field as a vertical display indicator has been recently developed for the purpose of integrating various sets of information into a single display. In one application, the unit is used to provide a single display in an aircraft to replace or augment the information previously obtained from a number of flight instruments mounted in different varied locations on a complex instrument panel. The display which is presented by the novel unit comprises a stylized picture of the real world that not only integrates the information necessary to establish the aircraft's attitude about its various axes, but also in a manner that is closely related to the pilot's picture of the real world. As a result of the integrated manner of presentation in a single display, the overall response time of the pilot to a changing situation is materially reduced. The reduction of such response time is, of course, important to the safety of the pilot.

A novel vertical display indicator which is operative in such manner has been set forth in the patent to George H. Balding, U.S. Pat. No. 3,093,822, which issued June 11, 1963, and is assigned to the assignee of the present invention.

In a basic display provided in one embodiment, the presentation comprises a ground texture and sky texture separated by a horizon line. The horizon line in straight and level flight extends laterally across the center of the display, and the horizon line is banked on the display with changes of the aircraft about the roll axis of the aircraft, and is moved upwardly or downwardly with changes in the pitch of the aircraft. The ground texture includes a set of symbols which emanate from the horizon and move in the direction of the lower marginal edge of the display to create the illusion of forward movement of the aircraft over the ground. The ground texture symbols are also displaced laterally on the display with changes in heading, and the symbols are changed in perspective with changes in pitch of the aircraft. In more sophisticated displays, the symbols change in size with altitude, and the rate of symbol movement is related to the aircraft speed. A display providing some or all of these basic symbols is identified hereinafter as a contact analog presentation.

In addition to the contact analog presentation, the generator circuitry disclosed in the above identified patent is also operative to provide a set of command symbols superimposed on the basic contact analog information to assist the pilot in carrying out different commands in various flight modes. One basic command symbol comprises a wedge-shaped flight path superimposed over the ground texture so as to permit a pilot to navigate his aircraft along a path in the same manner as one drives an automobile along a road or highway. The wedge-shaped path may be comprised of a plurality of parallel horizontal lines, successive ones of which are of an increasing width to create the appearance of a roadway extending in perspective toward a distant point. In certain embodiments tarstrip lines which extend across the path may also be provided. In a simplified version, the flight path may be defined by two marginal edge lines arranged to intersect with each other at an apex to provide an inverted "V."

In use of the arrangement there disclosed, the pilot merely maneuvers the aircraft to follow the path. Such a display unit provides valuable assistance to the pilot in the navigation and maneuvering of the aircraft. The degree of assistance is, of course, dependent upon the extent of information which the system is capable of displaying, and the manner of display of the information. That is, most aircraft navigational equipment which is now used in the field is of the mechanical indicator type, and the pilots have been extensively trained to respond to the indications provided by such equipment. Accordingly, in effecting a transition from the multiinstrument presentations now existent in most aircraft cockpits to an integrated presentation which more closely represents the real world, it is important in the interest of safety to provide a system which effects the display of the information in the integrated presentation in a manner which is consistent with the conventional presentations now familiar to the pilots.

It is an object of the present invention, therefore, to provide a novel display system in which a flight path and/or a contact analog display may be selectively connected for use with the different types of navigational equipment which are presently installed in existing aircraft, and specifically which is operative to present such information in an integrated display which more closely simulates a real world condition, and which nevertheless is consistent with, and related to, the presentations now provided on the multiinstrument panel.

As an aid to understanding the invention, a brief description of more conventional navigational devices now installed in private, commercial and military aircraft is set forth hereat. In the less complex installations, for example, the navigational equipment may comprise a simpler gyrocompass which provides the pilot with the magnetic heading of the aircraft. The gyro compass is normally mounted on the instrument panel below the aircraft windshield, and the compass dial rotates with changing headings to continually provide the magnetic heading to the pilot through a small readout window. Since the unit is mounted on the instrument panel of the aircraft, the pilot is frequently required to direct his attention away from the aircraft windshield and the outer world to obtain the magnetic heading reading provided by the compass.

It is an object of the present invention to provide a novel integrated display which is intended to assist the pilot in flying a predetermined course directed by a flight path command symbol, and particularly to provide a display in which such type path is controlled by the gyro compass of the aircraft. It is a specific object of the invention to provide means for selecting a desired course of flight, signal derivation means which are operative to derive signals from conventional gyro compasses of the type installed in many aircraft in the field today which indicate deviation from a selected flight course, and generator means controlled by the signal derivation means to generate signals which provide a flight path on the display which indicate the heading selected, and also any variation of the aircraft to the left or the right of the selected heading.

It is yet another object of the invention to provide a system which presents an integrated display including such flight path with a horizon line which is continually adjusted to represent changes of pitch and roll. In a preferred embodiment the system provides such display along with ground texture symbols which move to provide an indication of relative movement of the aircraft in the real world.

Another form of navigational equipment which is commercially available and now installed in many planes in the field is known as omni/localizer equipment which, when adjusted in the omni mode, provides a reading of the magnetic heading which is to be flown to reach a selected station. Such unit includes a selector switch for selecting a desired station, and a dial which the pilot adjusts until a rotatable needle pointer moves to a vertical position. At such time, the pilot reads the magnetic heading on a panel adjacent an indicator on the dial, which is the ground track to the selected station. Such unit also has a "to" and "from" mechanical indicator on the face thereof which indicates whether the indicated ground track is the course "to" or "from" the station.

Obviously, with wind drift and the like, the use of such equipment requires frequent reference by the pilot to the aircraft instrument panel for the purpose of observing possible changes in the ground track to the station, as well as reference to the gyro compass to ascertain the heading of the aircraft relative to the indicated course. It is a further object of the invention, therefore, to provide novel electronic circuit means which are operative to derive a signal output from the omni/localizer system when operated in the omni mode which controls the generation and display of the flight path, the near end of the path being continually adjusted by such signals to indicate the ground track which must be followed to reach the station selected by the omni system (i.e., the information now provided by the vertical pointer). In a preferred embodiment referred to herein as a ground stabilized path, the system also includes means for automatically adjusting the far end of the path to provide an indication of deviation of the aircraft heading from the selected heading to the station.

It is a further object of the invention to provide a novel course director system which generates an aircraft stabilized path. That is, if the pilot registers a radial bearing to a desired station in the omni receiver and the compass equipment, the novel course director system provides a flight path on the display which is automatically compensated for cross winds and the like, whereby guidance of the aircraft along the indicated path will bring the aircraft directly over the station. Stated in another manner, "crabbing" of the plane to compensate for drift, cross winds, etc., is automatically effected with maneuvering of the aircraft to follow the path provided on the display.

It is yet another object of the invention to provide signal derivation means for obtaining signals from such equipment when used in the localizer mode during landing of the aircraft at airports having ILS equipment, and means for coupling such signals to the flight path generator means to provide a flight path display of assistance to the pilot during landing. In use of the localizer equipment now on aircraft during a landing, the vertical pointer on the omni localizing equipment indicates the location of the aircraft relative to the landing strip. If the pilot should navigate to one side of the landing strip, the vertical pointer will pivot in a related manner to indicate the direction in which the aircraft must be maneuvered to return to its relative position over the landing strip.

It is, of course, obvious that in landing under certain weather conditions it may be desirable to utilize both the ILS equipment, and also maintain visual observation with the real world. The difficulties involved in maintaining contact with the real world through the windshield and simultaneously visually observing the pointer on the instrument panel are obvious. As a result, landing of an aircraft is frequently a critical period and it is extremely desirable to provide maximum assistance in navigational aids to the pilot at such time.

It is a further object of the present invention, therefore, to provide a display which may be more readily observed, and which will more quickly provide the information required for the pilot to maintain the aircraft position relative to the landing strip. It is a more specific object to provide novel electronic means for deriving signals which vary with the track signals obtained from the localizer equipment, and means for controlling the near end of the path in accordance with the deviation of the aircraft heading from the heading of the localizer.

It is yet another object of the invention to provide novel means for providing a display which includes such information as derived from the localizer equipment, in combination with means for controlling the system to simultaneously provide information relating to pitch, roll and yaw attitudes of the aircraft, whereby a complete integrated display of real world conditions is provided for the pilot in a single picture. In a preferred embodiment, the display also includes ground texture elements which emanate from the horizon, and move toward the lower marginal edge of the display to provide indications of aircraft movement.

It is yet another object of the invention to provide novel signal derivation means for obtaining signals from the glide slope receiver on an aircraft, which in known devices is represented on a localizer readout dial by a horizontal pointer which is displaced upwardly and downwardly to indicate variation of the aircraft above and below the glide slope path. It is a specific object of the invention to provide signal derivation means which vary the width of the flight path on a display with deviation of the aircraft fro the from the glide slope.

In yet another embodiment, such deviations from the glide slope are indicated by movement of the apex (or far end of the path) upwardly and downwardly relative to the horizon line.

Another well-known navigational aid device which is presently installed on a number of aircraft is commercially available as Automatic Direction Finder Equipment (ADF). In the use of such equipment the pilot tunes his ADF receiver to a desired station, and a mechanical readout device including a pointer automatically provides the pilot with the bearing of such station relative to the heading of the aircraft. To reach such station, the pilot need merely turn his aircraft from its heading through a corresponding number of degrees in the direction indicated by the pointer.

It is a further object of the invention to provide novel signal derivation means for obtaining a signal from the automatic direction finder system for use in controlling a flight path on a display device, and specifically for the purpose of controlling the flight path to indicate the heading which the pilot must fly to reach the desired station. It is a specific object of the invention to provide such arrangement in combination with a contact analog display including at least a horizon which is adjustable to indicate variation in pitch and roll.

There is yet another form of navigational equipment which is installed in certain types of airplanes, and commercially available in the field as a Frequency Modulator Receiver Unit which operates with associated ground communication equipment to provide indications of the locations of various stations on the ground. Associated means in the aircraft may be selectively operated to locate the relative position of a desired station, and a readout device via pointer means indicates a "steer right," "steer left" requirement for the pilot to reach a desired station.

It is yet another object of the invention to provide novel signal derivation means for providing signals to control the flight path on a display device in such manner as to indicate to the pilot the necessary direction of flight to reach the desired station. It is a specific object of the invention to provide such arrangement, in combination with a contact analog display including at least a horizon which is adjustable to indicate variation in pitch and roll.

The foregoing objects and features of the invention and others which are believed to be new and novel in the art are set forth in the following specification, claims and drawings in which:

FIG. 1 is a pictorial showing of a display which may be presented by the display unit in one basic embodiment, including a mode selector switch which is used in selecting different modes of operation, and indicator means for identifying the mode selected at any time;

FIG. 2 is a block diagram of the novel control circuitry of the display device selected by the mode switch in its different position;

Figure 3:
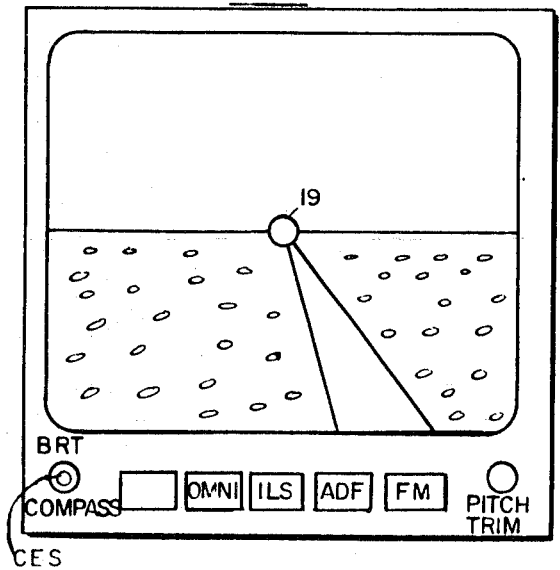
Figure 4:
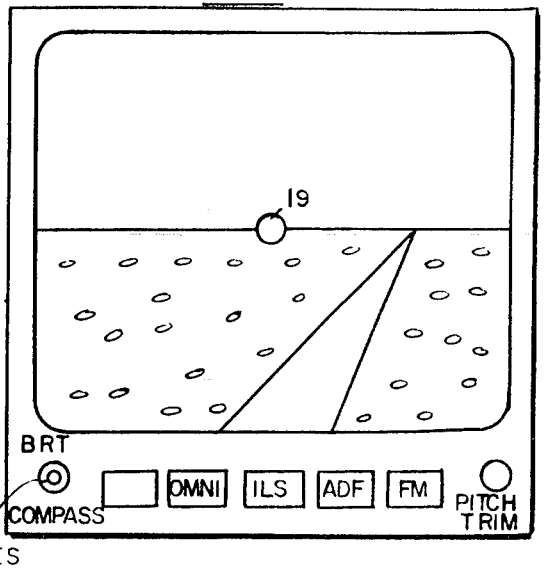
Figure 5:
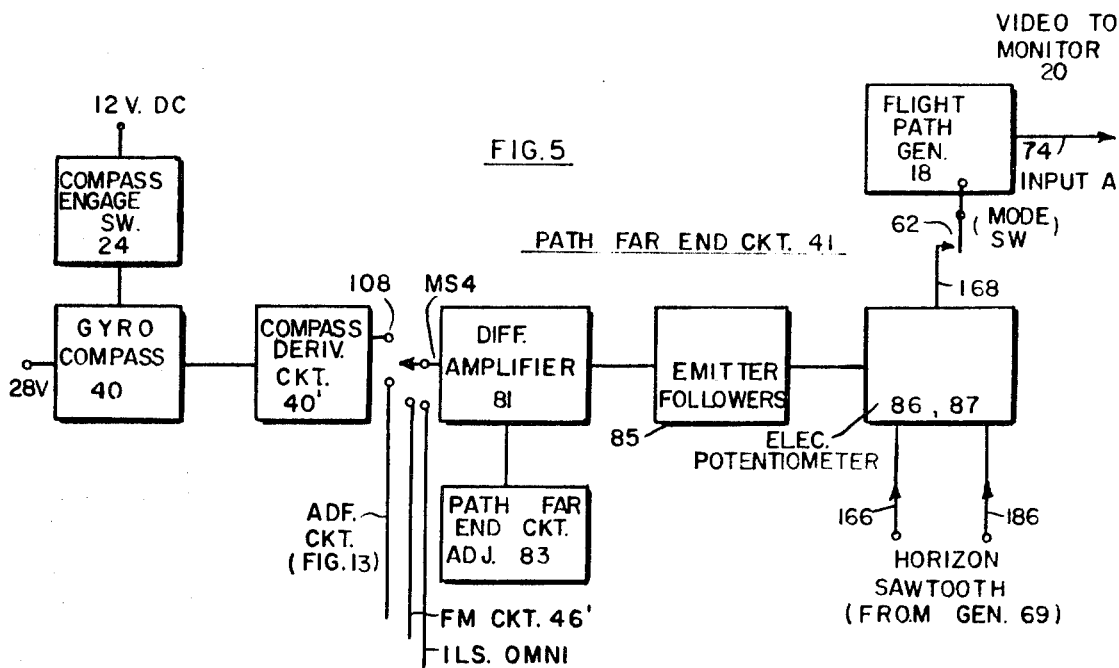
Figure 9A:
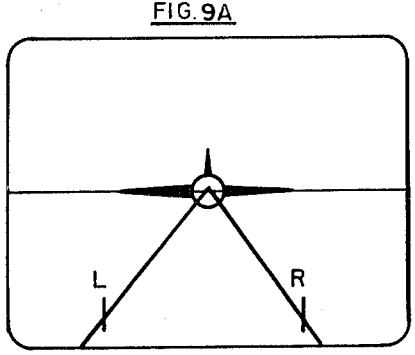
Figure 9B:
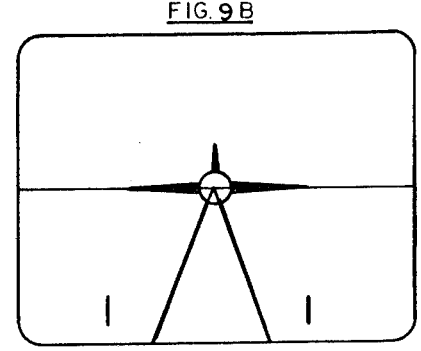
Figure 9C:
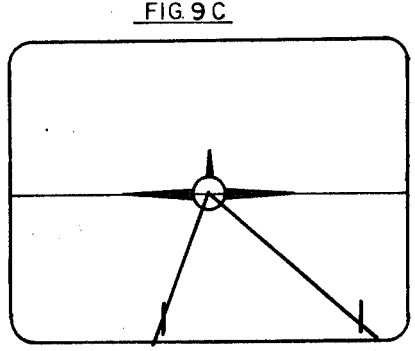
Figure 10:
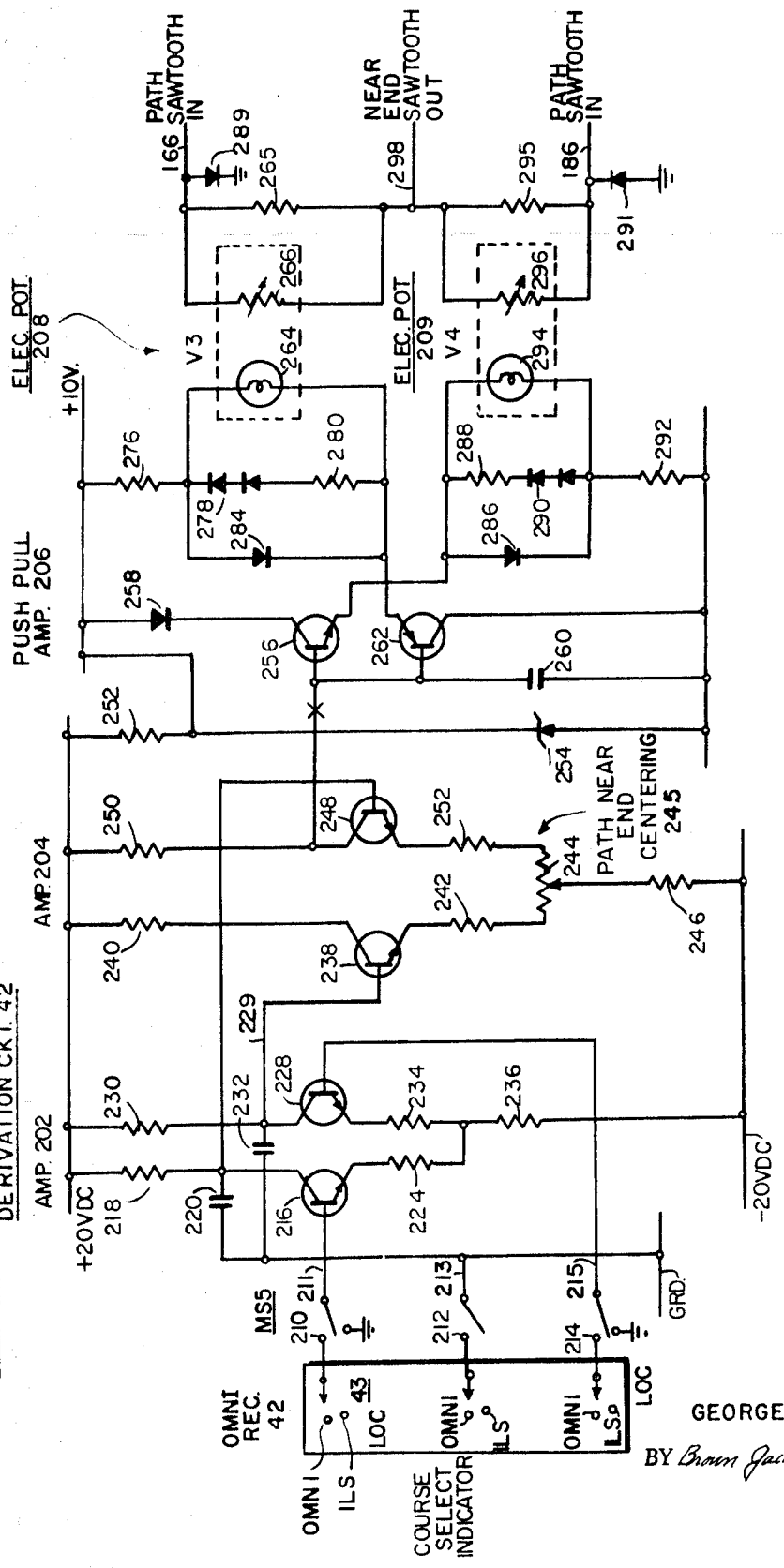
Figure 11:
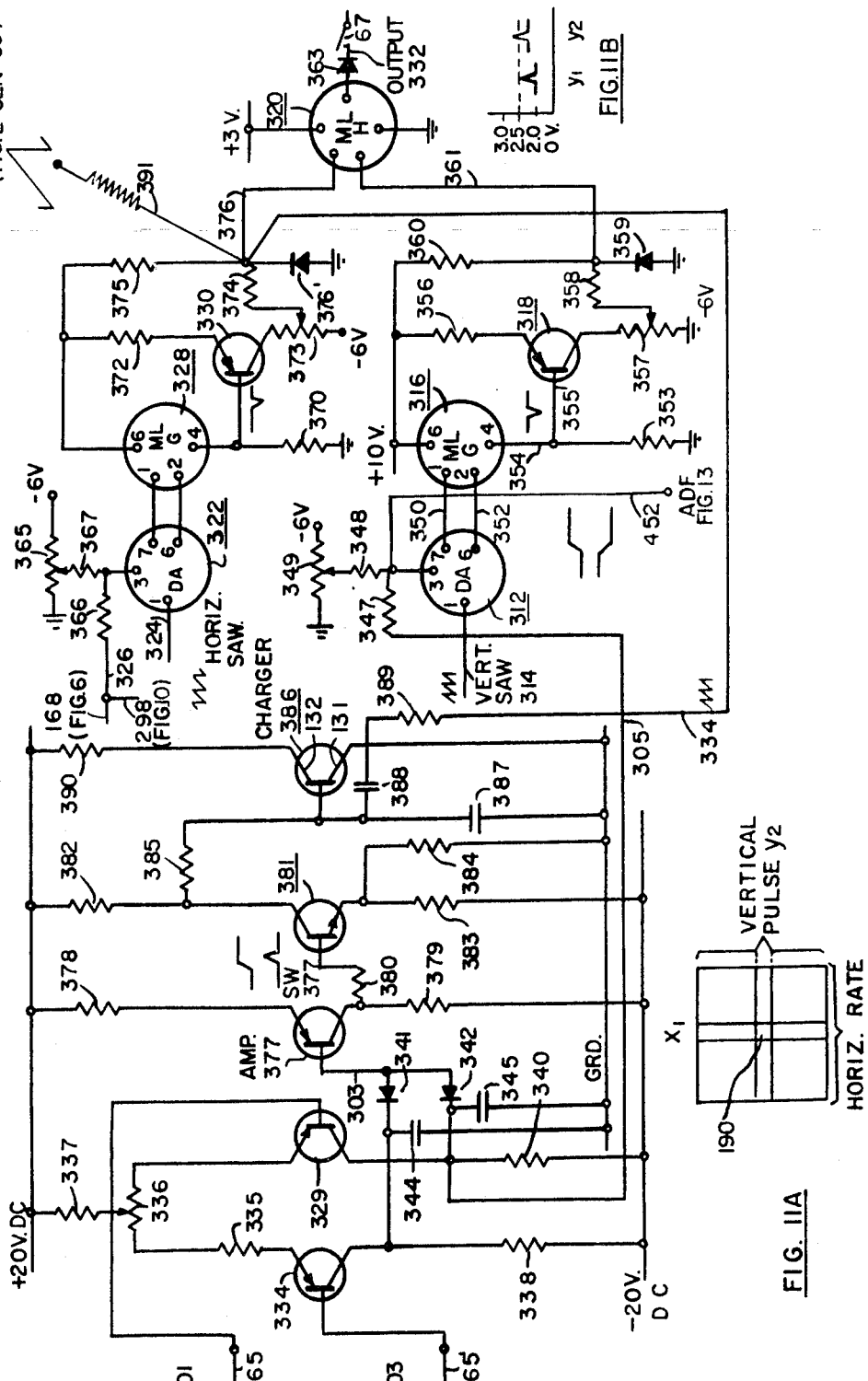
Figure 12:
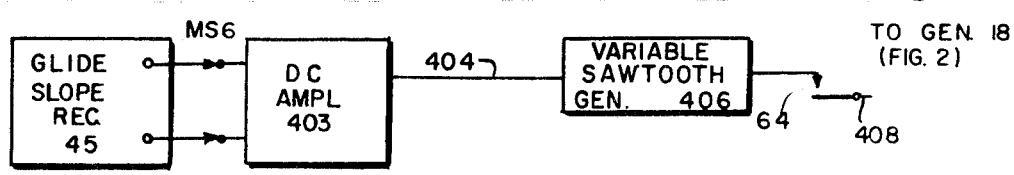
Figure 13:
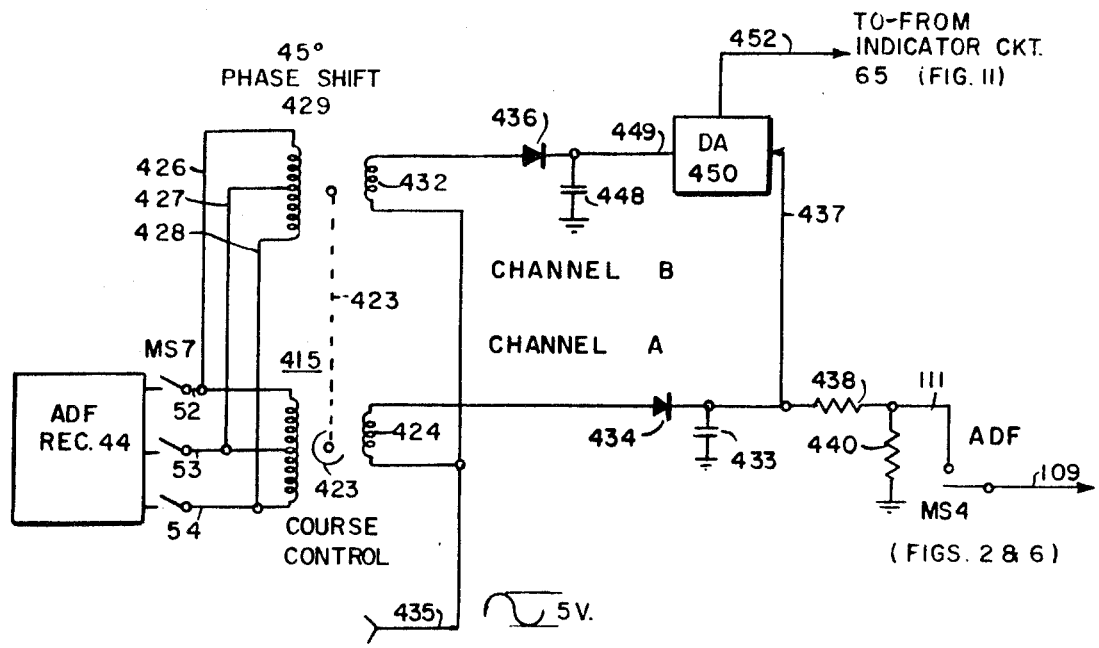
Figure 13A:
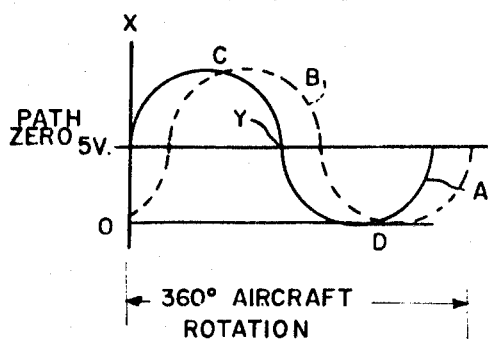
Figure 14:
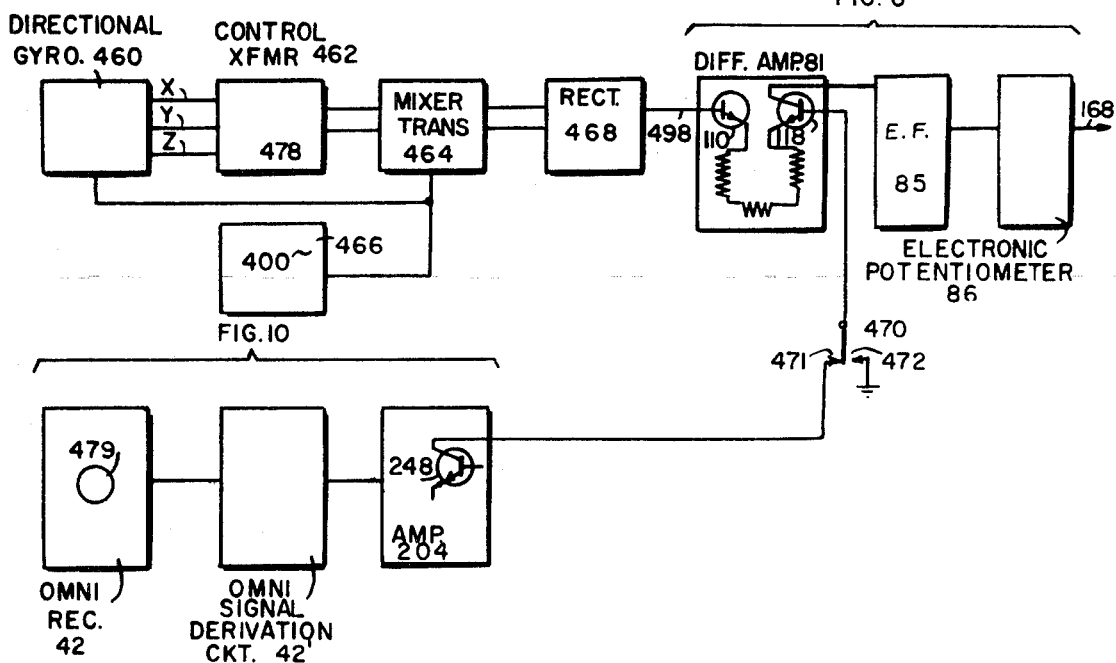
Figure 15:
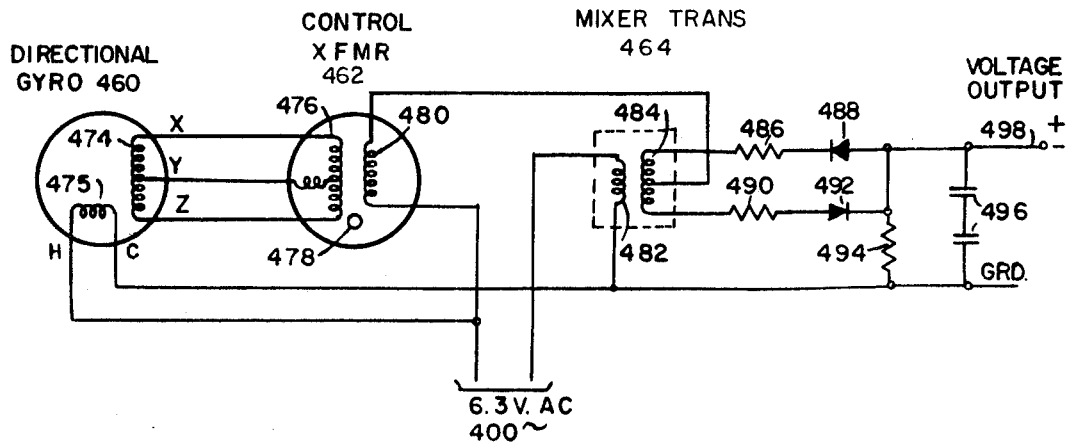

FIG. 2A sets forth the positions of the mode switch in more detail;

FIG. 3 and 4 set forth pictorial representations of representative displays provided with operation of the device in the compass mode;

FIG. 5 comprises a block diagram of the circuitry used in control of the flight path generator with operation of the system in the compass mode;

FIG. 6 illustrates the novel circuitry for effecting control of the flight path generation in accordance with the information received from the aircraft gyro compass including the path far end control circuitry;

FIGS. 6A–6P set forth waveforms provided by the circuitry of FIG. 6, and the general path outline provided on the display in response thereto;

FIGS. 7A–7D are pictorial illustrations of the display information provided during operation of the system in the omni mode;

FIGS. 8A–8C are further pictorial illustrations of the display presentations during the omni mode of operation; and associated FIGS. 8D–8F illustrate the relative position of the aircraft and the omni station with the presentations provided in FIGS. 8A–8C;

FIGS. 9A–9C illustrate the display presentations which may be effected during the operation of the device in the instrument landing system (ILS) mode;

FIG. 10 sets forth the circuitry for providing path near end control;

FIGS. 10A–10I illustrate representative waveform outputs of the circuitry of FIGS. 10 and the resultant flight path display;

FIG. 11 sets forth circuitry for providing the display of the symbol for "to," "from" indications in the omni, ADF modes;

FIG. 11A is a pictorial showing of the "to-from" symbol display,

FIG. 11B is an illustration of waveform signals which appear at the output of the symbol generator;

FIG. 12 sets forth the novel circuitry for controlling the flight path in accordance with signals received from the ILS localizer equipment;

FIG. 13 illustrates the circuitry used with the ADF equipment of an aircraft to control the generation of the flight path display in such mode;

FIG. 13A sets forth a voltage chart indicating voltages which occur in the control system of FIG. 13;

FIG. 14 is a block diagram of the novel course director system;

FIG. 15 is a circuit schematic of portions of the course director system of FIG. 14;

FIG. 16 sets forth an exemplary path which may be provided by the system in its control of an aircraft;

FIGS. 17, 17A–17H set forth exemplary displays of aircraft positions relative to a bearing to a station and the displays provided in such positions; and FIG. 18 sets forth a display including an indicator which locates the position of the station relative to the director path.

GENERAL DESCRIPTION

With initial reference to FIG. 1, there is shown thereat the display of a set of basic symbols which are provided by a vertical display indicator 8 to assist the pilot in controlling the aircraft under both contact and instrument flight conditions. As there shown, the display includes a ground texture 10 on a ground plane 11, a sky plane 12 separated from the ground plane 11 by a horizon line 14, and a flight path 16 superimposed on the ground plane 11 to provide course and/or heading information in accordance with the mode of operation selected.

The vertical display indicator 8, as shown in FIG. 2, comprises a flight path generator 18, a contact analog display generator 18' and a television monitor 20. A gyro horizon 48 provides signals to control the vertical position of the horizon line 14 on the display, and roll sensor 49 provides signals for rotating the yoke on the horizon 20 with variation of the aircraft about its roll axis. The specific circuitry of such system is set forth in detail in the above identified patent.

The present embodiment additionally includes a mode switch 22 which is operable to different positions to connect control signals to the flight path generator 18 from a plurality of novel circuits of the invention as set forth in detail hereinafter.

The television monitor 20 has a 30 cycle per second frame rate (60 fields per second) and a 525 lone picture with a 2:1 interlace. In a simplified embodiment the timer means may be eliminated and the monitor may be energized by a frequency generator operating at approximately 12 KC. The power input for the vertical display indicator (VDI) unit 8 may comprise a conventional aircraft power source of twelve or 28 volts direct current. One complete VDI unit 8 including a contact analog display generator 18', a flight path generator 18 and a display monitor 20 in a miniaturized version was housed in a single unit 5¼×5¼×12 inches and weighed approximately twelve pounds. The power consumption for the entire VDI unit was in the order of 40 watts.

The front panel display monitor 20 (FIG. 1) in the present invention locates a mode selection switch 22 which, as shown in FIG. 2A, is operable to a plurality of positions including off, CA on, compass, omni, ILS, ADF and FM. The front panel of monitor 20 (FIG. 1) also locates a compass engaging switch 24 for use with mode switch 22 in the compass mode, a brightness control knob 26 for controlling the brightness of the display, a compass mode indicating lamp 28, an omni mode indicating lamp 30, an ILS mode indicating lamp 32, an ADF mode indicating lamp 34, and an FM mode indicating lamp 36. Lamps 28, 30, 32, 34, 36 are illuminated whenever mode switch 22 is operated to the corresponding position to select the indicated equipment for use in controlling the flight path generator in the provision of the flight path on the display unit. A fixed reticle 19 is located on the face of the display, as shown in FIG. 1, to provide a reference mark for the pilot. A pitch trim knob 38 permits adjustment of the horizon line 14 vertically on the display so that the horizon line 14 may be adjusted into correspondence with reticle 19 when the aircraft is in level flight.

Mode switch 22, which may comprise a multilevel switch which closes a plurality of circuit completing contacts in each of its positions, is schematically shown in FIG. 2. Only certain of the contacts, such as 60–65, 65', 72 and MS4–MS8 which are important to the disclosure of the invention, are shown in FIG. 2. It will be apparent from the following description that contacts, such as 62, may in fact be a series of different contacts at the different positions of the mode switch which are tied together to complete the illustrated circuit to terminal A whenever one of the positions noted adjacent the contacts 62 is selected by the mode switch.

Briefly, as shown in FIGS. 2 and 2A as the mode switch 22 is operated from the "off" position to the "on" position an energizing circuit is completed from a 28 volt, 400~ power source over contacts 60 and switch 76 to the contact analog display generator 18' which, as thus energized, generates signals which provide the contact analog display on monitor 20 (FIG. 1) including the ground texture 10, ground plane 11, horizon line 14 and sky texture 12. A gyro horizon 48 is simultaneously connected to provide pitch indicator signals to the contact analog 18', whereby the horizon line display is varied in accordance with change of aircraft pitch. Roll sensor 49 is connected to control the yoke on the television monitor 20, whereby changes of the aircraft about its roll axis result in the corresponding banking of the horizon line 14 and associated display on monitor 20.

Mode switch 22 at its contacts 60 maintains connection of the energizing circuit to the contact analog display generator 18' in each of the subsequent positions of mode switch 22, whereby the contact analog information is normally displayed in combination with the flight path. In the event that the contact analog display is not desired, switch 76 (FIGS. 1 and 2) is operated to the open or off position.

With operation of the mode switch 22 to CA "on" position, power is connected to contacts 60 on the mode switch 22, which contacts are closed in the CA "on" position of mode switch 22, and are closed in each of the subsequent positions of the mode switch 22 which are now described. Closure of contacts 61 when the mode switch is moved to any of the subsequent positions supplies power to the flight path generator 18 to effect generation of the flight path display. A far end blanking circuit 67' is operative to blank the far end of the path (see for example FIG. 7A). As will be shown, with selection of the compass mode by operation of switch 22 to the compass position and operation of switch CES 24, for example, the blanking circuit 67' is disabled and the path far end appears. Absence of a path prevents the pilot from placing false reliance on a path which is not controlled by sensor signals.

Mode switch 22 is operative to a compass mode position (COMP) and in such position is effective at its contacts MS4 to selectively extend signals derived from gyrocompass 40 by a novel compass derivation circuit 40' to path far end control circuit 41, and at its contacts 62 is operative to extend the far end path control signals to input circuit A for the flight path generator circuit 18. As will be shown, with compass engage switch CES 24 closed, the control circuitry in such mode provides a flight path, the far end or apex of which is in registration with reticle 19 when the aircraft is on a selected course and which is laterally displaced from reticle 19 with changes in heading of the aircraft from the selected course.

Mode switch 22 is further operative to an omni position, and assuming the pilot has selected the omni mode of operation of receiver 42 by operation of omni receiver selector switch 43 to the "omni" position, mode switch 22 closes contacts MS5 to extend signals from omni receiver 42 to signal derivation circuit 42' and path near end control circuit 47, and at its contacts 63 extends signals provided by path near end control circuit 47 to an input A on the flight path generator circuit 18.

As used herein, the path far end refers to the portion of the path which is displayed at the path apex which, as shown in FIG. 1, occurs beneath reticle 19 for such condition of flight. The path near end is the portion of the path which occurs immediately adjacent the lower marginal edge of the display. The position of the path at the far end is determined only by path far end control circuit 41 and the position of the path at the near end is determined by the path near end control circuit 47. Accordingly, the apex of the path may be referred to as a first informative marking, and the near end of the path may be referred to as a second informative marking. The location of the path between such ends is determined by the signal output of both circuits 41 and 47.

Mode switch 22 in the omni position at its contacts 65 also connects the output of omni receiver 42 to the to-from circuit 66, and at its contacts 67 connects the output of the to-from circuit 66 to the input for the television monitor 20. Additionally, with operation of the mode switch 22 to the omni position, contacts MS4 are closed to connect the output of the compass derivation circuit 40' to the path far end control circuit 41, and as will be shown, the far end of the path on the display will provide indications of variation of the aircraft from a selected heading to a station and the near end will indicate indications variations from the ground track to a selected omni station.

In the ILS position, the pilot operates switch 43 on the omni-localizer equipment 42 from the omni position to the ILS position, and mode switch 22 is operated to the ILS position. In such mode of operation, mode switch 22 closes contacts MS6 to complete a circuit from the ILS glide slope receiver circuit 45 to ILS glide slope signal circuit 45' and at its contacts 64 extends the signals derived from the ILS glide slope circuit 45' to input circuit B on the flight path generator circuit 18. As will be shown, such control circuit effects adjustment of the path width with deviation of the aircraft from the glide slope. Mode switch 22 also closes contacts MS5 to extend the signal output of the ILS equipment 45' (which indicate variations of the aircraft from the ground track of the glide path) to signal derivation circuit 42' and to the path near end control circuit 47; at its contacts 63 extends the output thereof to input A on flight path generator 18 to control the near end of the path display to display deviations of the aircraft from the ground track. Mode switch 22 in the ILS position also closes contacts MS4 to connect the signal output of the compass derivation circuit 40', which, as will be shown, may be used to indicate deviation of the aircraft from the heading of the localizer equipment to the path far end control circuit 41, the signal output of the control circuit 41 being extended over closed contacts 62 to input A on the flight path generator 18 to control the display of the far end of the path with variation of the aircraft heading from the heading of the localizer equipment.

Mode switch 22 further includes an ADF position in which contacts MS7, MS4, 62, 65, 67 are closed, contacts MS7 being closed to couple signals from the automatic direction finder receiver 44 to the ADF derivation circuit 44' and contacts MS4 being closed to couple the output signals of circuit 44' to the path far end circuit 41. The output signals of path far end circuit 41 are coupled over contacts 62 to input A on the flight path generator circuit 18 to control the path far end in accordance with the heading of a selected station relative to the aircraft heading. In the ADF position, contacts 65 are also closed to complete a circuit from the ADF derivation circuit 44' to the to-from circuit 66, and contacts 67 are closed to connect the output of circuit 66 to the input for monitor 20 to effect the display of a symbol indicating the bearing extends "-to" or "from" the selected station.

In an FM position, the mode switch 22 closes contacts MS4, MS8 and 62, the contacts MS8 extending the signals from an FM receiver 46 to FM signal derivation circuit 46', contacts MS4 extending the output thereof to path far end circuit 41, and contacts 62 extending the output of the far end control circuit to the input circuit A on the flight path generator circuit 18.

The signal outputs of the flight path generator 18 and contact analog generator 18' and to-from circuit 66, as shown in FIG. 2, are connected over path 74 to a video amplifier (not shown) and the beam modulation circuit for the electron gun of the display tube in monitor 20. Points A and B on the flight path generator are specifically identified hereinafter.

The specific manner in which the various equipments are selected by mode switch 22 for operation in the control of the flight path display generator 18 to display the desired information on the monitor 20, and the specific manner in which the circuitry is operative to effect such manner of operation are now set forth in detail.

CONTACT ANALOG DISPLAY

With operation of the mode switch 22 from the off to the CA on position, the power source is connected over contacts 60 and switch 76 to the contact analog display generator 18' which operates to provide the contact analog display of FIG. 1 on the monitor 20 in the manner set forth in U.S. Pat. No. 3,093,822. As indicated above, and as shown in FIG. 1, in the present embodiment the contact analog presentation comprises a ground texture which is comprised of moving symbols 10 which emanate from the horizon 14 and move across a ground plane 11, and a sky plane 12 which is divided from the ground plane 11 by a horizon line 14 which is earth stabilized in pitch and roll.

The ground plane 11 upon which the ground texture 10 appears is dark gray at the horizon line 14, and gradually shades to a lighter gray near the bottom of the display area. The ground texture elements 10, shown in FIG. 1, are small at the horizon, closely spaced and slow moving, while ground texture elements at the bottom of the display are larger with greater spacing, and move at a faster rate.

An aircraft reticle 19 is inscribed on the center of the faceplate for the television monitor 20 so that the position of the horizon line 14 on the display may be viewed with respect to the fixed aircraft reticle 19 by the pilot, to thereby provide a quickly identifiable reference for use in the determination of the roll and pitch attitude of the aircraft. Changes in the pitch angle of the aircraft are indicated by vertical displacement of the horizon line 14 with respect to the aircraft reticle 19. Changes in roll attitude are indicated by banking of the horizon line.

Lateral motion of the ground texture elements indicates a change of aircraft heading. The effect created is that of a quasirandom pattern of elements or symbols forming a texture on the ground as viewed by a pilot through the windshield of his aircraft. All motion of the pattern on the ground is seen as pilot motion; that is, rolling, pitching, yawing and forward motion are perceived as motion of the ground texture elements due to the motion of the aircraft relative to the ground.

The sky plane 12 which appears above the horizon line 14 is of a light gray texture. As set forth in the above identified patent, other symbols and cues may be provided on the basic contact analog display. For example, since the total vertical dimension of the display on monitor 20 corresponds to a pilot viewing angle of 30°, pitch lines may be provided which are ground stabilized in the same manner as the horizon line. When the aircraft is in a pitchdown maneuver greater than 15°, the sky plane disappears from the top of the screen, and only the ground texture elements 10 and ground plane 11 are visible. A −30° pitch line appears at the bottom of the screen and moves to the center of the screen as the aircraft pitches down through an angle of 30°. In a similar manner if the aircraft is in a pitch-up maneuver greater than 15°, ground plane 11 disappears from the bottom of the screen and only the sky plane 12 is visible. The +30° pitch line appears at the top of the screen, and moves to the center of the screen as the aircraft "pitchup" angle increases to +30°. Pitch lines are also provided at 60° and 90°.

Display generator 18' may also be operative to provide a roll pointer comprising a white mark fixed with respect to the raster which is operative with a roll scale comprising a series of marks painted or etched on the face of the display and spaced at 10° intervals across the bottom of the screen to provide an indication of the aircraft roll attitude.

The contact analog presentation of FIG. 1 (without the flight path 16) is provided wherever the mode selection switch 22 is moved from the "off" to the CA "on" position. With such operation, contact analog indicator lamp 28 is also illuminated to indicate the energization of the display unit in the contact analog mode. As will be shown, movement of the mode switch to any of its other positions effects energization of additional circuitry, and also normally maintains the contact analog circuitry energized so that additional information is provided on the display along with the contact analog information. Switch 76 is opened if the contact analog information is not to be shown.

COMMAND DISPLAY

In addition to the basic contact analog information the equipment is also operative to provide command symbols superimposed on the basic contact analog information. One such symbol which has particular use with the contact analog is a flight path which may be provided as a basic command symbol along, or in superposed relation with the contact analog display. The flight path 16 as shown in FIG. 1 is superimposed over the ground plane of the contact analog, and allows the pilot to navigate his aircraft in a manner similar to the manner in which one drives an automobile on a highway. The flight path as there shown, comprises a wedge shaped symbol which creates the appearance of a roadway, the far end of which stretches to infinity, the roadway shape being defined by a series of parallel white lines, successive ones of which are of an increasing width. As disclosed in the above identified patent, a plurality of horizontal black tar strips may be provided at successive positions in spaced relation with each other on the path.

Horizontal movement of the flight path apex relative to an aircraft reticle symbol 19 is used to provide different heading command information. When the apex is superimposed on the aircraft reticle symbol 19 (as shown in FIG. 1) the aircraft is on the correct command heading. Additionally, the near end of the path may be displaced horizontally as shown in FIG. 3, or the path apex may be laterally displaced as shown in FIG. 4. Lateral displacement of the near end of the path as shown in FIG. 3 with the path apex in registration with the reference reticle symbol 19 indicates that the aircraft is on the correct heading but is to the left of the track. Lateral displacement of the far end of the path to the right (as shown in FIG. 4) with the near end in the normal central position would indicate that the aircraft is on track but is on the wrong heading. Other displays for different heading and track conditions will be apparent therefrom.

As will be shown hereinafter, whenever certain information is not received for the path near and far end display, such section of the path will be blanked out to prevent the pilot from relying upon such display. The manner in which the flight path is generated to provide the display of different information in the different modes of operation will now be set forth in detail.

COMPASS INPUT WITH CONTACT ANALOG MODE

As indicated above, with the operation of the mode switch 22 to the compass mode of operation, identified hereafter as the "COMP" position, contacts 61 close to connect power to the flight path generator 18, and thereby provide a display of the near end of the flight path in superimposed relation with the contact analog display; contacts MS4 close to connect the aircraft gyro compass 40 and signal derivation circuit 40' to path far end control circuit 41, and contacts 62 close to connect the output of control circuit 41 to control the flight path generator circuitry 18 in the provision of a flight path display which represents the information provided by compass 40 relative to a selected course. With closure of compass engaging switch 24, the far end blanking circuit 67' is disabled, and the far end of the path will appear on the display.

More specifically, in such method of use, the pilot first turns the mode switch 22 to the "COMP" position, and as the near end of the flight path appears, maneuvers the aircraft to the heading which is to be flown. Upon reading the selected heading (as shown by the compass) the pilot engages the compass engage switch 24 (FIGS. 1 and 2) and the far end of the flight path 16 will appear on the screen to provide a flight path in the manner illustrated in FIG. 1. The far end of the path is now locked to the selected comparison heading.

That is, any variation of the heading of the aircraft from the heading at the time of the operation of compass engaging switch 24 will result in a corresponding displacement of the flight path 16 on the display screen. Stated in another manner, any change in the aircraft heading from the selected compass heading will result in a horizontal translation or displacement of the path apex to indicate the heading error. The pilot in correcting for the heading error, flies towards the path apex. Thus, if the path apex is displaced to the right of the reticle symbol (FIG. 4), the aircraft is turned to the right until the path apex and the aircraft reticle symbol are once more coincident (FIG. 1). Similarly if the path apex appears to the left of the aircraft symbol, the aircraft must be turned to the left until coincidence of the path apex and symbol 19 occur. The circuitry for effecting such manner of operation is set forth in block form in FIGS. 2, 5 and in more detail in FIG. 6, and reference is now made thereto, for the purpose of more fully setting forth the manner of operation of the display device in the compass mode.

With reference first to FIG. 2, with compress engaging switch 24 engaged the mode switch 22 in the "COMP" position is effective at its switch arm MS4 to connect the signal output derived from gyro compass 40 by derivation circuit 40' to the path far end circuit 41, and mode switch contacts 62 extend the output signals of circuit 41 to input circuit A for the flight path generator circuit 18. As noted above, mode switch 22 at contacts 60 also maintains the power connection to contact analog display generator 18' and at its contacts 61 connects power to flight path generator 18.

As will be shown, in such manner of operation gyro compass 40 continually provides compass derivation circuit 40' with signals representative of the deviation of heading of the aircraft from the heading which was selected at the instant of closure of the compass engage switch 24, and path far end control circuit 41 provides representative signals over mode switch contacts 62 to input circuit A for flight path generator circuit 18 to control same in the generation of a flight path which indicates the amount of deviation of the aircraft relative to the selected heading. The specific manner in which such display is effected is now set forth.

PATH FAR END CIRCUIT 41

With reference to the block diagram of FIG. 5, the basic circuit arrangement for controlling the flight path generator 18 in such mode is shown to comprise a gyro compass 40, compass engaging switch 24 for energizing the lock-in equipment of the gyro compass 40, a compass signal derivation circuit 40, selection contacts MS4 on mode switch 22 which are operative in the "COMP" position to connect the output of gyro compass 40 to the path far end circuit 41. Path far end circuit 41 basically comprises a differential amplifier 81 including path far-end circuit adjustment means 83, push-pull emitter followers 85, and electronic potentiometers 86, 87 which control the horizon sawtooth signals received over input conductors 166, 186 from horizon line generator 69 and flight path generator circuit 18. With reference to the above identified U.S. Pat. No. 3,093,822, the equipment of FIG. 5 will have its conductors 166, 186 connected to a horizon line sawtooth generator (FIG. 2) which may be a conventional sawtooth generator of the type 274 shown in FIG. 15 of such patent which is connected to be energized by horizon line pulses obtained over point C (resistor 416 in such patent).

With reference now to FIG. 6, the specific details of the compass derivation circuit 40' and path far end control circuit 41 are set forth thereat. Gyro compass 40 used with such circuit in one operative embodiment comprised a commercial compass 976M-1 obtained from the Lear Company, which includes a compass engage switch 24 operative to connect a 12 volt DC signal to the gyro compass unit 40 as closed and a 12 volt disabling signal to the far end blanking circuit 69. With operation of switch 24, associated means in the compass lock to the particular course on which the aircraft is headed at the time of switch closure, and thereafter such means provide signals which indicate the variations of the aircraft from the selected heading. The gyro compass 40 is energized by 28 volt, 400 cycle output of a conventional aircraft inverter which is coupled over power conductors 78, 79 to the gyro compass 40.

With energization of gyro compass 40 by closure of the compass engaging switch 24, an output voltage appears over conductor pairs 50, 51 and 52, 51 which is in the order of approximately 2 volts. With variation of the aircraft in one direction from the course selected at the time of the closure of the compass engaging switch 24, the voltage across conductors 50, 51 will increase and the voltage across conductors 51, 52 will decrease by a corresponding amount. If the aircraft deviates from the selected course in the opposite direction the amplitude of the voltage on conductors 52, 51 will be increased, and the amplitude of the voltage at the conductors 50, 51 will be decreased by a corresponding amount. Thus, with operation and closure of compass engage switch 24, the gyro compass 40 will provide an indication of the amount and direction of deviation from the selected course.

The deviation representative output voltages are coupled over switch MS5 to the path far end control circuit 41 over a filter network including bridging capacitors 89, 91 which are connected between conductors 50, 51 and 51, 52 respectively for the purpose of minimizing transient noise signals which might otherwise be introduced into the path far end control circuit 41. A first voltage doubler clamping circuit 102 comprising series capacitor 90 and diode 93, and a second voltage doubler clamping circuit 102' comprising capacitor 92 and diode 94 are connected across the output conductors 50, 51 and 51, 52 respectively for the purpose of providing output signals of double amplitude for use in the path far end control circuit 41, whereby the amount of amplification required in later stages of the circuitry is reduced.

The alternating current outputs of the voltage doubler circuits are rectified by rectifiers 104, 105 and coupled to a summing network 103 comprising a first resistor 94' and a second resistor 96 connected between conductors 50, 51 and 51, 52 to mix the two output voltages together, and provide a resultant positive or negative output signal depending upon the value of the heading error (amplitude) and the direction of the heading error (polarity).

A pair of capacitors 100, 101 are connected between the junction of resistors 94, 96 in the summing network 103 and ground. A pair of capacitors 106, 107 connected across the summing network 103 provide further filter means for the input signals.

The output of the summing network 103 is coupled over conductor 108 and switch arm MS4 (whenever the mode switch 22 is in the "COMP" position) to the input for a differential amplifier 81 in the path far end control circuit 41 which comprises a pair of transistors 110, 118 which may be of the type commercially available as 2N910.

The collector of transistor 110 is connected over resistor 112 to a +20 volt current DC source. The base is connected over conductor 109, switch arm MS4 to the output conductor 108 of summing network 103, and the emitter is connected over resistor 114 and an adjustable resistor 136 in a "path far-end" adjustment circuit 83 to the collector of transistor 124. The collector of transistor 118 is connected over resistor 120 to +20 volt source conductor, its base is connected to ground, and also over diode 137 to a +10 volt source conductor, and its emitter is connected over resistor 122 to the opposite end of adjustable resistor 136.

The differential amplifier 81 is thus connected in a conventional arrangement to minimize possible variations in amplifier gain as a result of temperature variations. In the embodiment shown herein the amplifier 81 has a gain of approximately 3:1.

Potentiometer 136 which is connected between the emitters of the transistors 110, 118 in differential amplifier 81, has its adjustable arm connected to the collector of the constant current device 124 to permit adjustment of the amplifier signal output to different values. As will be shown, adjustment of the signal output effects a corresponding adjustment of the position of the far end of the path 16 relative to the aircraft reticle 19 (FIG. 1).

The constant current device is adjustment circuit 83 comprises a conventional transistor 124 which may be of the type available as a 2N910 commercially, having a base connected to a voltage divider 126, 128 which is connected between −20 volt DC and ground, and an emitter which is connected over resistor 130 to a −20 volt DC source. In accordance with established operating modes, the constant current device 124 makes available a constant current for the transistors 110, 118 of the differential amplifier 81.

The output of the differential amplifier 81 is extended to the input circuits for push-pull emitter followers 85 which includes transistors 140, 146 respectively connected in a push-pull arrangement. The base elements of transistors 140, 146 in addition to being connected to the output circuit of differential amplifier 81 are connected over filter capacitor 144 to ground. The collector of transistor 140 is connected over diode 142 to the +10 volt source and the collector of transistor 146 is connected to ground.

The transistors 140, 146 operate as emitter followers to adjust the effective resistance value to be provided by associated electronic potentiometers 86, 87 for the sawtooth output circuits. It will be apparent that as the conductivity of one transistor of the pair 140, 146 is increasing, the conductivity of the other transistor will be decreasing, the nature of the conductivity and the output signals to the electronic potentiometer 86, 87 provided by transistors 140, 146 being determined by the polarity and amplitude of the signal of the differential amplifier 81 to the push-pull amplifier 85.

The emitter of the transistor 140 is connected to an electronic potentiometer 87 which includes a photoresistor V2 having a lamp 180 and associated photoresistor 182, a first pair of voltage limiter diodes 172, 174 connected in parallel with the lamp 180 of the photoresistor V2 and a pair of diodes 168, 170 connected as short protection in the event of failure of the transistor 140.

The energizing circuit for lamp 180 thus extends from +10 volts over diode 142, transistor 140, resistor 176, lamp 180 and resistor 178 to ground. It will be apparent that the extent of energization of lamp 180 and the light output thereof will be dependent upon the values of current flow provided over transistor 140 which is in turn dependent upon the amplitude and polarity of the deviation signal provided over differential amplifier 85 by compass derivation circuit 40'.

The resistance element 182 of photoresistor V2 is connected in parallel with resistor 184 between the "in" path sawtooth conductor 186 and "out" path sawtooth conductor 168. Variation of the light output of lamp 180 thus adjusts the value of the resistance provided by photoresistor V2 in the sawtooth output path 168 as will be shown.

In one embodiment, with zero output from the compass derivation circuit 40' (to indicate the aircraft is on the selected position) the signal applied to the lamp 180 of photoresistor V2 was in the order of 5 volts. Such value was increased to 10 volts and decreased to 0 volts in accordance with the amplitude and polarity of the deviation indicating signals provided by compass derivation circuit 40'.

The second electronic potentiometer 86 is similar to electronic potentiometer 87 and comprises photoresistor V1, including lamp 160, photoresistor 162, voltage limiter diodes 152, 154, shunt protection diodes 148 and 150, and resistors 156, 158, connected in the manner of the elements of electronic potentiometer 87.

The second transistor 146 of the push-pull amplifier 85 is thus operative in the manner of transistor 140 to control the flow of current to the lamp 160 for photoresistor V1 over a path which extends from +10 volts DC over resistor 158, lamp 160 in photoresistor V1, resistance 156 and transistor 146 to ground. The degree of illumination of lamp 160 in photoresistor V1, and therefore the value of resistance 162 provided by photoresistor V1 in the sawtooth path extending from "in" conductor 166 over resistor 164 to "output" conductor 168, will vary in accordance with the extent of current flow over transistor 146 which is in turn dependent upon the polarity and amplitude of the output signal provided over differential amplifier 81 by compass derivation circuit 40'. As in the first potentiometer 87, a signal of approximately 5 volts is applied to lamp 160 of photoresistor V1 when the aircraft is on the selected heading, and the applied signal varies between 0–10 volts in accordance with the direction and degree of derivation of the aircraft from the selected course.

As noted above, resistance members 162 and 182 of the photoresistors V1, V2 are connected respectively across resistors 164 and 184 in the path sawtooth input circuits 166 and 186 which are connected to the horizon line sawtooth output conductors of generator 69. The input waveform over path 166 comprises a negative-going sawtooth, and the input over path 186 comprises a positive-going sawtooth. It will be apparent that the waveform of the sawtooth provided over path 168 is determined by the effective value of the resistors 162, 182 in the photoresistors V1, V2 respectively. In effect, therefore, the waveform of the path sawtooth provided over conductor 168 is adjusted to different values by the adjustment of electronic potentiometers 86, 87 which are in turn controlled by the amplitude and polarity of the output signals of the compass derivation circuit 40' which represents deviation of the aircraft from a selected heading. Illustrative examples of such adjustment in the signal output, and the results thereof will now be set forth.

With reference to FIGS. 6A–6P, the first FIG. 6A illustrates the positive-going sawtooth waveform input over conductor 186, and the FIG. 6B illustrates the negative-going sawtooth waveform which is received over conductor 166, each of which sawtooths is received at the vertical rate of the raster. In the embodiment illustrated herein, the leading edge of the sawtooths are locked or synced to the horizon line 14 (FIG. 1) and accordingly the path apex will move up and down with the horizon line. It will be apparent moreover that in other embodiments such "locking" of the path and horizon line may not be desired.

In the event that the aircraft is on the course selected by closing of the compass energizing switch 24, the signal output of the gyro compass 40 at the output terminals 50, 52 will be equal, (+2 volts and −2 volts), and the output of the summing network 103 will be zero. With zero output signal coupled to differential amplifier 81, the output signal to the photoresistors V1, V2 by amplifier 85 is in the nature of 5 volts. Since the output of the photoresistor V1, V2 is equal and opposite and the sawtooths received over paths 166, 168 are of an inverse complementary order, zero output occurs over path 168 (FIG. 6C). Accordingly, with zero output to the flight path display generator 18, the novel display of the flight path 16 will be shown on the display monitor 20 (FIG. 6D).

Assuming now that the aircraft heading moves to the right of the selected heading, the path apex on the display monitor 20 will be displaced to the left to indicate that the aircraft should turn to the left to return to the desired course (FIG. 6H). In the event of such deviation the output signal of the compass derivation circuit 40' will be more negative to control transistor 146 to conduct more than transistor 140. As a result, the light output of lamp 160 increases, and the value of resistance 162 decreases to cause the output circuit 168 to see more of the negative sawtooth coupled over path 166 (FIG. 6F).

In a similar manner, decreased conduction of the transistor 140 will control the photoresistor V2 to increase the value of resistance 182, whereby the output circuit 168 will see less of the positive sawtooth on conductor 166 (FIG. 6E) and a waveform similar to that shown in FIG. 6G is coupled over conductor 168 to the flight path circuitry 18 to effect the output shown in FIG. 6H.

The manner of operation of the path far end control circuit 41 to provide a more positive sawtooth output over circuit 168 with deviation of the aircraft heading to the left of the selected heading and thereby the display of FIG. 6L will be apparent from such description and the waveforms 6I–6K.

In certain embodiments it may be desirable to provide a curved path on the display in the manner shown in FIG. 6P, whenever the aircraft veers from the desired course. To obtain such display, it is merely required to place a capacitor in series with the sawtooth input path 166, 186, the capacitor being of a small enough value to differentiate the sawtooth and thereby provide a nonlinear sawtooth of the type shown in FIG. 6M, 6N, 6O.

With disengagement of the compass engage switch 24, the far end of the path disappears, and the path will no longer display the displacement of the aircraft from the selected heading. Movement of the mode switch 22 to another position effects disconnection of compass derivation circuit 40' from the path far end control circuit 41. Contacts 62 and 65 are opened if a position other than that noted adjacent such contacts is next selected.

It is noted hereat that far end blanking circuit 67 basically includes an input circuit connected to the horizon line vertical sawtooth (of a positive-going signal), and electrical switch which is connected to the output of amplifier circuit 165 (FIG. 19) of the above identified patent). With the compass engage switch 24 open, the circuit shorts the output of amplifier 65 during the trace of the upper half of the path. With closure of the switch 24, the blanking circuit is disabled and the full path is drawn.

DISPLAY PRESENTATION DURING OMNI OPERATING MODE

The mode switch 22 (FIG. 1) as noted above is also operative to a further position "OMNI" to close contacts MS5 to connect the signal output of an omni receiver 42 (which may be Model 15F commercially available from the Aircraft Radio Corporation, Boonton, N.J.), to omni signal derivation circuit 42'; and contacts 63 to connect the output of path near end control circuit to the input circuit A on the flight path generator circuitry 18. In such position of mode switch 22, the vertical display unit 8 provides a pictorial display to the pilot of information which is now provided in the above identified Model 15F by movement of a pair of needles on a course indicator instrument (such as ARC IN–10) associated with the conventional omni equipment.

In the operation of such known type of device in the "VOR" mode, a vertical pointer visually indicates the "VOR" or localizer information received from associated converter circuits. The pointer is pivoted at the top, and moves left or right to provide a visual indication of the lateral position of the aircraft with respect to the "on-course" signal of the VOR or localizer.

A To-From meter indicates whether the aircraft is going toward or away from the station. A red flag is associated with each pointer, and the To-From meter, to indicate the receipt or absence of output signals from the converter for such indications.

A course selector device on the omni indicator in the omni receiver 42 identified above permits the selection of any course "to" or "from" a VOR station, or indicates the magnetic hearing of the aircraft with relation to the VOR station. The course selector device includes a dial which is located for movement relative to a graduated compass scale of 360°. A triangular-shaped pointer is used to indicate the course to a station, and a ball is used to indicate the reciprocal of the course on the indicator scale.

The "to-from" meter is a zero-center, DC instrument which is used to prevent any ambiguity in reading of the course on the indicator dial. That is, the meter will show "to" when the indicated bearing on the course indicator dial is a magnetic bearing to the station, and "from" when the bearing on the course indicator dial is a magnetic bearing from the station. When reading the "to-from" meter it is necessary that the vertical pointer be in its approximate center position, whenever the aircraft passes through the neutral point of the localizer or the received signal is too weak to be reliable.

The omni equipment now installed in many aircraft may be used in numerous ways to provide navigational aids to the pilot. A few of the navigational procedures which may be followed during the omni mode of operation include (a) determining the aircraft bearing relative to an omni station, (b) flying a desired course "to" or "from" an omni station, (c) flying to an objective using two omni stations, (d) obtaining approximate ground speed check by using two omni stations, (e) intersecting a localizer using an omni station, (f) approach procedure, and others.

Figure 7A:
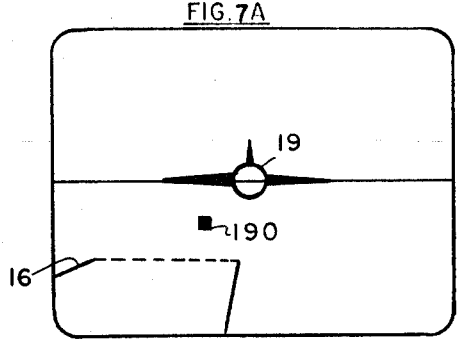
Figure 7B:
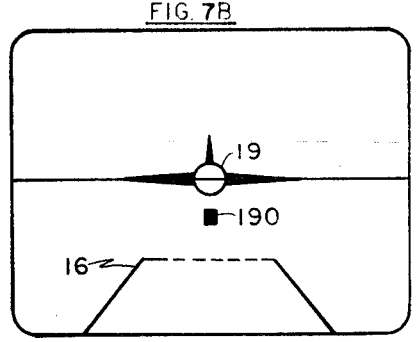

An exemplary description of one manner of operation of the device in assisting a pilot in the omni mode to fly from a desired course "to" or "from" an omni station is now briefly set forth hereat. The pilot initially adjusts his omni equipment 42 to tune in the desired omni station. The mode switch 22 is then turned to the "OMNI" position, and at contacts 61 connect power to flight path generator 18 and at contacts 63 close to provide signals which control the near end of the flight path 16 to appear on the display, one example being shown in FIG. 7A. The pilot then adjusts the course select knob on the omni receiver 42 so that the near end of the path moves to the center of the display as shown in FIG. 7B. At this time, the pilot checks for the presence of a to-from symbol 190 on the display. If the symbol is in the position shown in FIG. 7B, the aircraft is on a course directed toward the desired omni station. If the symbol is in the position shown in FIG. 7D, the aircraft is on a course directed away from the selected omni station.

Figure 7C:
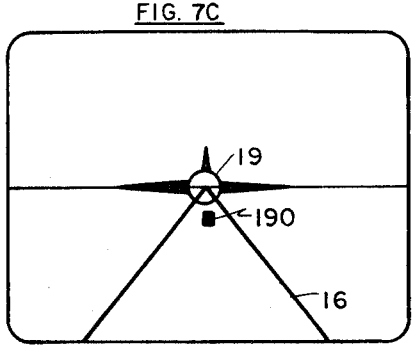

The pilot then turns the aircraft until the compass heading on gyro compass 40 is the same as the bearing shown on the course select dial of omni equipment 42, and closes the compass engage switch 24. As a result, far end blanking circuit 67' is disabled and the far end will appear on the display as shown in FIG. 7C.

The system is now ready for the pilot to use in the navigation of the aircraft to the selected omni station by simply following the directions of the flight path 16. Heading error will be indicated by a horizontal shift in the path apex position from its registration with reticle 19 (such error being provided, as noted above, by gyro compass 40, compass derivation circuit 40' and path far end control circuit 41 with variation of the aircraft heading from the compass heading selected) and ground track error will result in a horizontal shift in the path near end position (the ground track information being obtained from the omni receiver 42). Exemplary showings of such manner of presentation are now set forth.

The flight path in the display of FIG. 1 is provided whenever the aircraft is on the correct ground track and correct heading for a selected localizer station. That is, the path apex is in registration with the fixed reference reticle 19, and the near end of the path is located centrally of the display.

With reference now to FIG. 8D a further flight condition is shown thereat. In such showing, the path 187 indicates the bearing of a localizer station 188 as detected by the omni equipment on an aircraft 189. As shown by the position of the aircraft relative to the path 187, the aircraft is on path 187, but the heading of the aircraft is incorrect. That is, if the pilot continued on the indicated course, the aircraft would quickly be moved away from the correct ground track. It is readily apparent that a turn to the right will place the aircraft on the correct heading as well as the correct ground track.

The flight path 16 which is provided on the display whenever the flight condition of FIG. 8D occurs, i.e., the aircraft 189 is on the correct ground track but on the incorrect heading is shown in FIG. 8A. As there shown, the near end of the path is in its normal position centrally of the display, but the far end of the path has turned to the right from the fixed reference reticle 19. It will be readily apparent to the pilot therefrom that it will be necessary to turn the aircraft to the right to bring the aircraft to the heading indicated in FIG. 8A the aircraft will have to turn from its present true heading of approximately 310° to a true heading of 345°. As the aircraft turns, the far end of the path 16 will be moved back into registration with the reticle 19 as shown in FIG. 1 to indicate to the pilot that the aircraft is back on the correct heading.

In a further illustration set forth in FIG. 8E the aircraft 189 is shown to be on the correct heading, but on the incorrect ground track. That is, the aircraft 189 is displaced laterally to the left of the desired path 187. It is apparent therefrom that the pilot will have to turn the aircraft to the right to bring the aircraft to the proper ground track. Such flight condition is displayed in the manner shown in FIG. 8B wherein the near end of the flight path is displaced to the right of its center position, to indicate to the pilot that the aircraft is to the left of the correct ground track. In that the far end of the path 16 is in registration with the reticle 19, the aircraft is known to be on the correct heading.

In the disclosure of FIG. 8F, the aircraft is shown to be on the incorrect heading and ground track, and it will be apparent that the pilot must continue on his course to reach the correct ground track and then turn left to the correct heading.

Such flight condition is represented on the display in the manner set forth in FIG. 8C. With reference thereto, it will be quickly determined that the near end of the path 16 is displaced to the right of its center position (i.e.; the aircraft 189 is to the left of the correct ground track) and that the aircraft must continue to the right to reach the correct ground track.

Since the far end of the path 16 is displaced to the left of the reticle 19, it will be apparent that upon reaching the track 187 it will be necessary to turn to the left until the end of the path is once more in registration with reticle 19.

The small black square indicator symbol 190 in each of the FIGS. 8A, 8B, 8C comprises a "to" indicator which indicates that the aircraft 189 is following a path which is directed toward (rather than away from) an omni station, such as 188. The symbol 190 in the present equipment appears as a solid black square approximately ¼ inch×¼ inches in size, and when the displayed path is "to" an omni station the square is located in horizontal center of the flight path and near the apex or far end of the path (FIG. 8A–8C). If the symbol is located near the path base, the aircraft is heading from the station (see for example FIG. 7D).

Summarily, when the apex of the path 16 is superimposed on the aircraft vertical symbol 19, the aircraft, such as 187, is on the correct heading. If the near end of the path is in the center of the display, the aircraft is on the correct ground track. As will be shown hereinafter, the heading information for controlling the position of the path apex is obtained from the gyro compass 40. The ground track information which controls the position of the near end of the path is obtained from the omni receiver 42. It is apparent that such information (ground track and heading) may be displayed by the flight path along or together, as shown in FIGS. 7A–7D.

In use of the system, allowances can be made for drift by operating the compass engage switch 24 when the heading of the aircraft 189 is that of the omni station, such as 188, plus or minus the angle of drift which is to be set in.

As a safety precaution, the novel system is operative in the event of the loss of the near end or far end input signals to effect "blank" out of the corresponding portion of the path so that the pilot does not unwittingly rely upon an incorrect display. FIG. 7A, for example, illustrates the appearance of the path 16 in the event that the far end signal has not been received, or is too weak to be safely used. The near end of the path will be blanked out in a similar manner with the loss of the near end signal.

The circuitry and manner of operation of the circuitry in controlling the near end of the path 16 for use in the omni mode is now set forth in detail.

OMNI CONTROL CIRCUITRY

The omni signal derivation circuit 42' is illustrated in FIG 10, and as there shown mode switch 22 at its contacts MS5 is operative in the OMNI position to connect the output terminals 210, 212, 214 of omni receiver 42 to the input terminals 211, 213, 215 of the omni signal derivation circuit 42', which, as shown, basically comprises a differential amplifier 202. Path near end circuit 47 connected to the output thereof comprises a second differential amplifier 204, a path near end centering circuit 245, a push-pull current amplifier 206, electronic potentiometers 208, 209, a positive sawtooth input 186, a negative sawtooth input 166 and a near end sawtooth output conductor 298 which extends over mode switch contacts 63 to the input circuit A on the flight path circuitry of the display generator 18.

With the selection knob 43 on the omni receiver 42 turned to the "omni" position, the omni receiver 42 (Model 15F) is operative to provide 20 milliwatt alternating current signals across terminals 210, 212; 214, 212 which represent the ground track to the selected station. Mode switch 22 at its contacts MS5 connects omni receiver terminal 210 to a first input terminal 211 of differential amplifier 202, connects omni terminal 214 to a second input of differential amplifier 202, and connects ground over terminals 213, 212 to the omni receiver 42.

Differential amplifier 204 comprises a first transistor 216 having a collector connected over resistor 218 to a +20 volt DC source, and over capacitor 220 to ground, a base connected to the input terminal 211 (and selectively to the output terminal 210 of omni receiver 42) and an emitter connected over resistors 224, 336 to a −20 volt DC source. Differential amplifier 202 includes a second transistor 228 including a collector connected over resistor 230 to the +20 volt DC source and over capacitor 232 to ground, a base connected to the input terminal 215 (and selectively to terminal 214 of the omni receiver 42) and an emitter connected over resistor 234, 236 to −20 volt DC source, and over resistor 224 to the emitter of transistor 216.

Differential amplifier circuit 202 operates in a known manner to amplify the signal output of the omni receiver 42, which output is coupled over input terminals 211, 215 to the input circuits of the second differential amplifier 204. Differential amplifier 202 has a gain of approximately 2, and by reason of the connection of the transistors 216, 228 to the two different output terminals of the omni receiver 42 (actually the bridge output of a meter in receiver 42), any noise appearing at the output terminals is in effect cancelled out by reason of the differential action in the amplifier 202. The differential amplifier 202 is also operative in such manner to minimize variation due to temperature changes.

The second differential amplifier 204 comprises a first transistor 238 which includes a collector connected over resistor 240 to the +20 volts direct current source, a base connected over conductor 229 to the output of the second transistor 228 of the first differential amplifier 202, and an emitter connected over resistance 242 and one end of a path near end centering potentiometer 245, the adjustable tap 244 on potentiometer 245, and resistor 246 to negative 20 volt DC. The second transistor 248 of the differential amplifier 204 includes a collector connected over resistance 250 to the +20 volt DC source, a base connected to the output of the first transistor 216 in the first differential amplifier 202, and an emitter connected over resistor 252 to the opposite end of path near-end centering potentiometer 245, the adjustable arm on resistor 245 and resistor 246 being connected to −20 volt direct current source.

The signal output of omni equipment 42 as amplified by the first and second differential amplifiers 202 and 204, is approximately 5 volts whenever the aircraft (such as 189—FIGS. 8D–F) is on the correct ground track, and increases to 8 volts with deviation of the aircraft 189 from the ground track 187 in one direction, and decreases to 2 volts with deviation of the aircraft 189 relative to the ground track 187 in the other direction. The output of the second differential amplifier 204 is coupled to the transistors 256, 262 in the push-pull current amplifier 206.

Transistor 256 which conducts responsive to the receipt of the positive-going signal from differential amplifier 204, comprises a collector connected over diode 258 to +10 volts DC source, a base connected to the output of the second differential amplifier 204, and an emitter connected over the control circuit for electronic potentiometer 209.

The electronic potentiometer 209 includes a photoresistor V4 having a lamp 294 and photoresistor 296. A pair of diodes 290 and series resistor 288 are connected across lamp 294 in photoresistor V4 as voltage limiting devices, and a diode 286 is connected across the lamp for short protection purposes. Resistor 292 is connected in series across the 10 volt conductor and ground with lamp 294 and transistor 256 and diode 258.

The second transistor 262 of the push-pull amplifier 206 includes a collector element connected to ground, a base element connected to the output of the second differential amplifier 204, and an emitter in circuit with the electronic potentiometer 208.

Electronic potentiometer 208 includes photoresistor V3 having a lamp 264 for controlling an associated photoresistor 266. A pair of diodes 278 and series resistor 280 are connected across lamp 264 in a voltage limiter arrangement, and diode 284 is connected across lamp 264 to provide short protection. Resistance 266 in photoresistor V3 is connected in parallel with resistance 265 which is in turn connected between path sawtooth input conductor 166 and path near end output circuit 298. A negative-going sawtooth wave is received over conductor 166 at the vertical rate from the horizon line generator 69 (see FIG. 2).

In a similar manner, resistance 296 which is controlled by the intensity of the energization of lamp 294 in photoresistor V4, is connected in parallel with resistance 295 which is in turn connected between the negative path sawtooth "in" conductor 186 and path near end conductor 298. A positive-going sawtooth is received over conductor 186 from the flight path generator 18 at the vertical rate.

Positive and negative path sawtooth signals provided over conductors 186, 166 are clamped to ground by diodes 289, 291 respectively to permit the path near end to be adjusted laterally without motion of the far end. The signals as thus extended over the adjustable potentiometers 208, 209 result in output sawtooth waveforms having amplitudes adjusted in accordance with the variation of the aircraft from the correct ground track. The output signals on conductor 298 are connected over contacts 63 to input circuit A on the flight path generator 18. In the above identified patent, input circuit A is connected to resistor 469 (FIG. 18).

With reference now to FIGS. 10A, 10B, and 10C, there is set forth thereat representative waveforms which are provided by the path near end control circuit 47 for different flight conditions along with pictorial representations of the path displays which are provided on the monitor 20 with the generation of such waveshape. With reference first to the set of waveforms in FIG. 10A there is shown thereat a positive-going sawtooth which is received over input conductor 299, and a negative-going sawtooth which is received over input conductor 297.

Assuming initially that the aircraft is on the desired course, the output of the omni receiver 42 will provide a balanced signal output over the differential amplifiers 202, 204 (FIG. 10) to the input of the push-pull amplifier 206 (which will be in the order of five volts) and photoresistors V3, V4 will provide a substantially equal value of resistance in the respective potentiometers 208, 209, whereby the sawtooth provided to near end output conductor 298 as summated, will result in a substantially zero output (FIG. 10B). As a result, the near end of the path which is controlled by the output signal over conductor 298 will be in the center position as shown in FIG. 10C.

In the event that the aircraft is to the right of the correct ground track, the value of the output signal provided by omni receiver 42 at terminal 210 decreases, and the value of the signal at terminal 214 increases. The resultant signal which appears at the output of the second differential amplifier 204 decreases from the previous 5 volt value to effect increased conductivity of transistor 262, increased illumination of lamp 264 and a decrease in the value of resistance 266. In a similar manner, the conductivity of transistor 256 is decreased, the illumination of lamp 294 is decreased and the value of resistance 296 is increased. The resultant sawtooth waves provided to conductor 298 are shown in FIG. 10D and the summated sawtooth output which is coupled over conductor 298 is of a positive value, as indicated by the waveform appearing in FIG. 10E. As a result thereof, the flight generator 18 is controlled to provide a flight path which, as shown in FIG. 10F, has the near end of the flight path 16 disposed to the left of the normal center position shown in FIG. 10C. As set forth above, such display indicates to the pilot that the aircraft should be turned to the left to bring the aircraft back on the proper ground track.

It will be apparent from such description that with the movement of the aircraft to the left of the path, the sawtooth output of the electronic potentiometers V3, V4 will be as shown in FIG. 10G, and a summated negative sawtooth, such as shown in FIG. 10H, will be coupled over output path 298 to provide the resultant display shown in FIG. 10I.

The amplitude of the waveforms shown in FIGS. 10E and 10H will vary directly with the extent of departure of the aircraft from the correct ground track. As indicated above, the system is also operative to provide adjustment of the path far end as an assist to flight in the omni mode to the selected omni station. In such manner of operation, the pilot ascertains the relative bearing of the selected omni station in the manner above described, and pilots the plane to such heading. As the plane arrives at such heading, the pilot engages the compass engage switch 24 and compass 40, compass derivation circuit 40' and path far end control circuit 41 operate in the manner heretofore described to provide signals over contacts 62 to input terminal A of flight path generator 18, whereby both the near end and far end of the flight path are adjusted as in the omni mode to provide path direction to the pilot.

GENERATION OF TO-FROM SYMBOL—GENERAL

As indicated heretofore in the foregoing description, mode switch 22 in the omni mode also enables a to-from indicator circuit 66 (FIGS. 2 and 11) which generates signals to provide a to-from symbol 190 (FIGS. 7A–7D) for display, the signal being positioned on the display by control signals provided over mode switch contacts 65 by the omni receiver 45.

The symbol 190 which appears on the display comprises a white square approximately ¼ inch by ¼ inch in size which is located in the horizontal center of the flight path 16. The vertical position of the symbol 190 will indicate whether the aircraft is heading "to" or "from" the selected omni station. Thus, if the symbol 190 is located near the path apex (FIG. 7C) the aircraft is heading toward the station. If the symbol is located near the path base (FIG. 7D) the aircraft is heading away from the station. As now shown, novel circuitry is provided to generate and position the to-from symbol in such manner, and to further provide a blinker circuit which causes the size of the symbol to vary in a rapid manner whereby the display appears as a blinking symbol whenever the aircraft is passing over the omni station, or alternatively whenever the aircraft is out of range of the omni station.

With reference now to FIG. 11, the novel to-from circuitry 66 for effecting such manner of symbol generation and location is set forth thereat.

As there shown, movement of the mode switch 22 to the OMNI position effects closure of contacts 65, 65' to selectively couple the output terminals 301, 303 of the to-from indicator 300 in omni receiver 42 (which is a standard component of a commercial OMNI navigational unit, such as ARC type 15FH navigation equipment), to the input circuit of a novel to-from circuit 66. The output of the to-from indicator 300 basically comprises signals which vary between +30 millivolts and −30 millivolts, the output signal being of one polarity whenever the signal is a "to" signal, and of an opposite polarity whenever the signal is "from."

To-from circuit 66 includes symbol generator 310 which generates signals for providing a square symbol on the display, the vertical positioning of such symbol being determined by the output signals provided by indicator 300. The to-from circuit 66 further includes a first section having a differential amplifier 302 for amplifying the output signal of the to-from indicator 300, the output of differential amplifier 302 being coupled over a first path 303 to a blinker circuit 306 and over a second path 305 to the symbol generator 310.

Symbol generator 310 basically comprises a first stage including a differential amplifier 312 which is controlled by signals received over input circuit 305 from differential amplifier 302, and a vertical sawtooth input conductor 314, a micrologic gate 316 and an amplifier transistor 318 which is connected to one input of a half adder circuit 320.

A second stage in the symbol generator 310 includes a differential amplifier 322 controlled by horizontal sawtooth input conductor 324 and path input 326, a micrologic gate 328 including amplifier transistor 330 which couple the combined amplified signals received over circuits 324, 326 to a second input on half adder circuit 320. The combined output of the half adder circuit 320 is extended over output circuit 332 and mode switch contacts 67 (which close to the video amplifier for the monitor device 20 with mode switch 22 in the omni and ADF positions).

As will be shown, the symbol generator 310 generates a square symbol 190 during each raster trace, the vertical position of which is determined by the signal input over conductor 305. The signal input received over conductor 326 determines the horizontal location of the symbol, conductor 326 being tied to the far end path control circuit whereby the symbol is laterally adjusted with each lateral displacement of the path apex.

In accordance with a novel concept of the present invention, a blinker circuit 306 is connected to operate in response to the receipt of a signal over input circuit 303 which indicates the presence of the aircraft over an omni station, or alternatively a signal which indicates the aircraft is out of range of the omni station, and specifically, is operative in response to receipt of such signal to provide a signal over output circuit 334 to the second stage of the symbol generator 310 to effect variation of the width of the generated symbol at a rapid rate to thereby provide a blinking signal for the purpose of indicating the detected information to the pilot.

With specific reference now to the to-from circuit 66 (FIG. 11), with the mode switch 22 in the omni position, contacts 65, 65' are closed to connect the signal output of the to-from indicator 300 over terminals 301, 303 to the first and second stages respectively of the differential amplifier 302. The first stage, for example, comprises a transistor 334 having an emitter connected over resistor 335, an adjustable resistance 336 and resistor 337 to the +20 volt direct current source, a base element which is connected over mode switch contacts 65' to the output terminal 303 of the to-from indicator 300; and a collector element connected over resistor 338 to −20 volts direct current. The second stage comprises transistor 339 which has an emitter connected over adjustable resistor 336 and resistance 337 to the +20 volt direct current source, a base element which is connected over mode switch contacts 65 to the output terminal 301 of the to-from indicator 300, and a collector element connected over resistor 340 to −20 volts direct current and also over the conductor 305 to an input circuit for the differential amplifier 312 in the symbol generator 310. The collectors of the transistor 334, 339 are also connected over diodes 341 and 342 respectively to the input circuit for blinker circuit 304. Filter capacitors 344, 345 are connected between the collector circuits and ground.

SYMBOL GENERATOR 310

The signal output provided by differential amplifier 302 over the to-from conductor 305 to the symbol generating circuit 310 will, for different conditions, comprise (a) a positive polarity signal, (b) a negative polarity signal, (c) no signal at all.

The to-from signal as amplified by differential amplifier 302 and coupled over conductor 305 is fed via a voltage divider network including resistors 347, 348, 349 to one input of the differential amplifier 312. A vertical sawtooth is coupled over a second input 314 at the rate of the vertical trace, and waveshapes of the type indicated in FIG. 11 adjacent differential amplifier 312 are provided over the output circuits 350, 352 respectively of the differential amplifier 312.

Biasing potentiometer 349 is adjustable to different positions to vary the portion (or segment) of the vertical sawtooth which is extended over the output circuits 350, 352, which, in turn, determines the portion of the changing wavefronts illustrated thereat which is extended to the micrologic gates 316. The differential amplifier 312 is an integrated circuit of the type commercially available from Fairchild Transistor Company, which has a differential gain in the order of 50.

In accordance with well-known operating techniques, micrologic gate 316 basically comprises two transistors connected in a conventional emitter-follower configuration and having their outputs tied over a common output conductor 354 and resistor 353 to ground, and also over conductor 355 to amplifier transistor 318.

Micrologic gate 316 comprises two emitter followers connected with their emitters together to provide a triangular shaped waveform over output circuit 354 in the manner shown in FIG. 11.

Figure 7D:
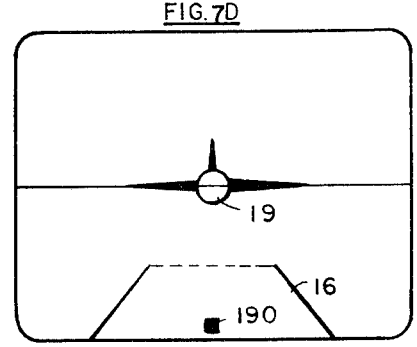

In accordance with well-known operating principles, the one transistor of the pair in gate 316 will be conductive during the time period that the negative-going waveform on conductor 352 decreases from ten volts in the direction of 0 volts. At the approximate time that the first transistor connected to the conductor 352 becomes nonconductive, the rising waveform being coupled to the second transistor over conductor 350 is increased to a value at which the second transistor is conductive, and remains conductive until the end of the waveform. It is apparent therefrom that the output of the emitter-follower gates in the micrologic circuit 316 to the input circuit for amplifier transistor 318 will comprise the triangular-shaped pulse shown in FIG. 11 adjacent conductor 355. The pulse occurs during the vertical trace of the raster at a time which is in turn determined by the setting of potentiometer 349, and the input signal received over conductor 305. As shown in FIG. 11A the time of occurrence of the vertical pulse determines the vertical position of the symbol on the raster. Manifestly, if a larger signal is provided over conductor 305, the time of generation of the pulse in the vertical trace will be delayed, and the pulse will occur at a lower position of the display (FIG. 7D).

Amplifier transistor 318 includes an emitter element connected over resistor 356 to +10 volts, a base element connected to the output of the gate 316 and a collector element connected over an adjustable resistance 357 to −6 volts. An adjustable arm on resistance 357 is connected over resistance 358 to the junction of a circuit including diode 359 and resistance 360 which are connected between +10 volts and ground.

The output of amplifier transistor 318 which comprises an amplified triangular-shaped pulse is coupled over conductor 361 to one input of the half adder circuit 320. The adjustment of the potentiometer 357 to different positions in effect of the potentiometer 357 to different positions in effect changes the direct current bias which is mixed with the triangle, and coupled to the one input of the half adder 320. Diode 359 is operative to prevent the output of transistor 318 from going too far in the negative direction.

It will be apparent that as the direct current bias added to the triangular-shaped pulse increases, a larger portion of the triangle pulse exceeds the direct current reference level (and the width of the triangular portion which exceeds such level increases in like manner), whereby the half adder 320 will be made conductive for an increased interval of time in each vertical trace. In a similar manner if the added direct current bias is reduced, a smaller portion of the triangular waveshape exceeds the reference level and a signal of reduced width is provided to control the conductivity of the half adder circuit 320 for a reduced period in each vertical trace.

The triangular waveshapes shown in FIG. 11B illustrate the difference in effectiveness of a 2 volt triangle pulse when the direct current reference is 2.5 volts and a direct current bias is added to provide a first pulse y, having a maximum value of 2.5 volts, and second pulse $y_2$ having a maximum value of 3.0 volts. Thus, triangular signals of different effective widths are coupled to the first input circuit of half adder 320 for different conditions, and as shown in FIG. 11A, the width of the pulses "y" at the point at which the pulse exceeds the reference value determines the height of the symbol.

In the second stage of symbol generator 310, differential amplifier 322 which may be similar to differential amplifier 312 in the first stage receives a sawtooth waveform over one input circuit 324 at the horizontal rate. Signals received over input circuit 326 from conductor 168 (FIG. 6) and conductor 298 (FIG. 10) are extended via voltage divider 365, 366, 367 to one input of the differential amplifier 322. The signals thus received vary with changes of position of the near end and far end of the flight path so that the to-from symbol is displaced laterally with the flight path near end and far end. As will become apparent, the setting on the symbol lateral positioning potentiometer 365 determines the reference point for the horizontal sawtooth received over input circuit 326, the differential amplifier 322 being switched only when the sawtooth is of sufficient amplitude to overcome the bias provided by divider 365–267. The waveform output of the differential amplifier 322 is similar to the waveform output of differential amplifier 352 except that the waveforms occur at the horizontal rate of the raster.

The signal output of differential amplifier 322 is coupled over conductors 368, 369 to a micrologic gate 328 in the manner of the pulses in the vertical circuitry except that the pulses coupled to gate 328 occur at the rate of the horizontal lines in the raster and the pulses which are coupled to gate 361 occur at the vertical rate of the raster. The triangular shaped pulse output of the gate 328 (which comprises a pair of emitter followers connected common over resistor 370 to ground) is extended over an output conductor 371 to the input circuit for transistor amplifier 330.

It will be apparent that the time of occurrence of the triangular-shaped pulse during a line trace determines the horizontal point on the display device at which the initial trace of the symbol will occur. Further, the width of the effective base of the triangle (i.e., the portion which exceeds the reference value) determines the width of the symbol. Accordingly, adjustment of the potentiometer 365 to different positions will result in generation of the symbol at different points in the horizontal trace, and lateral adjustment of the symbol on the display is also effected by coupling the signals from conductor 168 and 298 to the input 326 of the differential amplifier 322 so that the symbol will be tied to the far end of the flight path as the flight path is displaced laterally to indicate off-heading information.

Transistor amplifier 330 includes an emitter element connected over resistor 372 to the +10 volt source, a base element connected to the output of the gate circuit 328 and a symbol width control resistor 373 connected to the −6 volt source. The adjustable arm of resistor 373 is connected over resistor 374 to the second input circuit 376 on the half adder 320. The input circuit is also connected over resistor 375 to +10 volt source and over the protective diode 376 to ground.

The adjustable potentiometer 373 is operative to different positions to adjust the direct current reference level for the triangle-shaped pulse which is coupled to the second input circuit 376 for the half adder 320 at the horizontal rate. With adjustment of the direct current reference value, the effective base portion of the triangular waveform is adjusted to different values, and the width "X" of the symbol 190 along its horizontal dimension on the display screen is varied in a like manner (see "X" in FIG. 11A).

In accordance with well-known half-adder techniques, the half-adder circuit 320 is operative to provide a signal output over diode 363 and output circuit 332 only during the period that the combined portions of the pulses on conductors 361, 376 is sufficient to overcome the bias of the half-adder circuit 320. The resultant symbol provided will be apparent from the disclosure in FIG. 11a which illustrates the symbol produced by the combined pulses X, Y.

Summarly, adjustment of potentiometer 349 will displace the symbol vertically, adjustment of potentiometer 357 will vary the height of the symbol, adjustment of potentiometer 365 will displace the symbol laterally, and adjustment of potentiometer 373 will adjust the width of the symbol.

With the aircraft headed toward a station, a first signal is provided by to-from indicator and differential amplifier 302 over conductor 305 to cause the symbol to appear at the vertical position indicated in FIG. 11A. As the aircraft moves to a position and location in which it is going from a station, the signal output of the to-from indicator changes as noted above, and the amplified signal output of differential amplifier 302 is extended over conductor 305 to differential amplifier 312, whereby the DC reference level is changed to control the generation of the symbol more closely adjacent to the bottom position of the display (see FIG. 10); i.e., if the raster is traced from the bottom toward the top the signal input to differential amplifier 312 is increased to bias differential amplifier 312 to switch earlier in the trace and thereby effect earlier generation of vertical triangular pulse "y" during the raster trace.

A half-adder circuit, such as 320, is shown and described in detail on page 42 of the brochure "Custom Microcircuit Design Handbook," copyright 1963, by Fairchild Semiconductor. The gate circuits 316 and 328 are shown and described in detail in the technical publication No. 114, dated Oct. 9, 1963, entitled "Fanout" published by Fairchild Semiconductor, Mountain View, California. The differential amplifiers 312, 322 may be found described in detail on page 39 (the "conventional" connection thereshown) of the Custom Microcircuit Handbook.

BLINKER CIRCUIT 306

It will be recalled that the signal output from each section of the differential amplifier 302 in addition to being extended to the symbol generator circuit 310, is also extended over diodes 341 and 342 respectively, to the input of blinker circuit 306. As shown in FIG. 11, blinker circuit 306 basically comprises an amplifier 377, a switching transistor 381, a discharge control transistor 386, and an output circuit 334 which is connected to the input circuit 376 of the half-adder 320 in the symbol generator 310 to vary the DC level for half adder 320 in a rapid manner. The rate of change of the output triangle wave shape provided by the differential amplifier 302 with the aircraft over a station will be a function of the speed of the aircraft, the altitude of the aircraft and other similar environmental conditions.

More specifically, transistor amplifier 377 includes an emitter element connected over resistor 378 to a +20 volt DC source, a base element connected to the signal output of the differential amplifier 302, and a collector connected over resistance 379 to −20 volt direct current source, and over resistor 380 to the input of switching amplifier 381.

It will be recalled that as an aircraft, such as 189, reaches a point where it is moving over a station, such as 188 FIG. 4D), the output signals at the respective terminals 301, 303 of the to-from indicator 300 will be of an opposite polarity and at their maximum value. As the aircraft 189 proceeds over a station, the signal output at each terminal reverses its polarity, and reaches the maximum value of the other polarity. As the aircraft 189 proceeds away from the station 188, both output signals of the indicator 300 will proceed towards zero as a function of the increasing range.

As a result of the change of the signals from a signal of maximum amplitude of one polarity at each of the terminals 301, 303, the output signals of the differential amplifier 302 as coupled over diodes 341, 342 to the transistor amplifier 377 will be of a triangular-shaped waveform, the positive leading edge slope of which will turn off transistor 377, which, in turn, will provide a negative-going wave front in the collector circuit of transistor 377 to cause the switching transistor 381 to turn off.

Switching transistor 381 comprises an emitter element biassed by divider 383, 384 which is connected between −20 volts DC and ground, a base connected to the output of the amplifier 377 and a collector connected over resistance 382 to +20 volts DC, and also over a resistance 385 which is a part of a charging circuit for a timing capacitor 387.

The charging circuit for capacitor 387 extends over resistor 385, 382 to +20 volts DC. Base 131 of double base diode 386 is connected to ground, and base 132 is connected over resistor 390 to +20 volt DC. An output circuit comprising capacitor 388 and resistor 389 is connected over output circuit 334 to the input circuit 376 for the half-adder 320. As will now be shown, with a. the detection of the "over station" position of the aircraft,
b. the loss of a signal by reason of equipment failure, or
c. flight of the aircraft to a location where a signal is not received, (i.e., out of range of the transmitter) the blinker circuitry 306 will provide a signal to the half-adder 320 which results in the intermittent variation of the width of the symbol at a rapid rate which thereby appears on the display as a blinking-type warning signal to the pilot.

More specifically, as the transistor 381 is turned off by reason of such occurrence, the charging circuit for capacitor 387 is completed from +20 volts over resistor 382, 385 and capacitor 387 to ground. The capacitor 387 charges, and as the charge on the capacitor reaches a value sufficient to overcome the bias for the double base transistor 386, base 131 conducts, and the capacitor 387 is discharged to ground. With reference to the waveform adjacent the output circuit 334, it will be observed that during the period of charging, the waveform has a rising slope, and at the point of discharge of capacitor 387 by switch 386, the vertical trailing edge of the sawtooth waveform is generated. The sawtooth in one embodiment was generated at the rate of approximately 2 cycles per second to control blinking (i.e., whenever the aircraft is over a station or loss of signal occurs).

In addition, the horizon line sawtooth output waveform obtained from horizon line generator 69 at the vertical rate of the raster (FIG. 2) is coupled over resistor 391 to input circuit 376 of the half-adder circuit 320. As a result, the width of the symbol is being continually changed by the horizon line sawtooth to provide a symbol having a width which varies as a function of its vertical position on the path. That is, when the sawtooth is at its smallest amplitude, the symbol, as traced on the screen, is at its narrowest width, and as the sawtooth becomes progressively more positive in successive raster traces, the width of the symbol increases in a corresponding manner. The sawtooth signal received over conductor 334 causes the symbol to blink at the two-cycle rate.

As the aircraft moves over and past the station, the triangular shaped signal output of differential amplifier 302 is terminated, and transistor 377 once more conducts to turn off transistor 381 and thereby terminate the generation of the blanking sawtooth pulses. As indicated above, as the aircraft moves out of range of the station, the amplitude of the output signals of indicator 300 decrease toward zero, and the circuitry operates as above to effect blanking of the symbol.

INSTRUMENT LANDING SYSTEM (ILS MODE)

Mode switch 22 (FIG. 2) is operative to a further position "ILS" to connect the system for use during the landing operation. In the ILS mode of operation, the display must provide a presentation of the position of the aircraft relative to the heading and ground track, and further must provide information relative to the glide slope for the pilot. In the disclosed embodiment the path width at the near end is made a function of glide slope error, typical examples of displays which are provided during the ILS operating mode being set forth in FIGS. 9A-9C.

As shown in FIG. 9A, whenever the aircraft is on the correct glide slope, the path marginal edges intersect the center of the glide slope markers L and R, which comprise short vertical bar symbols displayed near the bottom of the display as shown. The markers L and R are used as references for the path and are movable with pitch changes of aircraft and with lateral displacement of the path near end.

With reference to FIG. 9B, the showing therein illustrates the path which is displayed when the aircraft is above the glide slope, and specifically, the path marginal edges are located inwardly of the vertical reference marks and the apex angle has decreased as a function of positive error. Correction for positive error requires that the pilot reduce aircraft altitude until the path marginal edges diverge from the position shown in FIG. 9B to intersect the glide slope control markers L and R as shown in FIG. 9A.

As shown in FIG. 9C the aircraft is on the correct glide slope and the path intersects the glide slope control markers L and R as shown. However, the markers L and R and the path have been displaced to the right to indicate that the aircraft is to the left of the correct ground track, and it is now necessary for the pilot to turn to the right to bring the path and markers back to the position illustrated in FIG. 9A.

It will be apparent that with the aircraft below the flight path, the path marginal edges will extend outside the markers L and R. Thus, the path in conjunction with the glide slope markers L, R, provides the pilot with relative glide slope information.

With operation of the mode switch 22 (FIG. 1) to the ILS position, contacts MS5 connect the output of omni receiver 42 to the omni signal derivation circuit 42', contacts MS6 connect the output of ILS equipment on receiver 45 to the ILS glide slope signal circuit 45', contacts 65' to path altitude marker generator; and contacts MS4, connect the signal output indicating the relative heading information obtained from the ILS station control circuit 41.

With reference to FIG. 10, mode switch contacts MS5 connect output terminals 210, 212, 214 of omni receiver 42 to input terminals 211, 213, 215 of the omni signal derivation circuit 42' to control such circuit in the adjustment of the flight path near end to different positions in the same manner in which the path was adjusted to represent different ground track information with the mode switch 22 in the omni position, as described above. However, in the ILS mode the ground track information provided over contacts 210, 212, 214 to the signal derivation circuit 42' is obtained by the aircraft equipment from ground ILS localizer equipment rather than an omni station by reason of the fact that selection means 43 (FIGS. 2 and 10) on the omni ILS receiver equipment has been operated to the ILS localizer position. The sawtooth output signals for controlling the path near end are extended over contacts 63 to input terminal A on the flight path generator 18 to control the path near end in the manner heretofore described.

As noted above, mode switch 22 in the ILS position may also be connected to close contacts MS4 (FIGS. 2 and 9) whereby the far end of the path is also controlled in the ILS mode. It is necessary, as before, to determine the heading information provided by the localizer station, and maneuver the aircraft to such heading. Thereupon the compass engage switch 24 (FIG. 9) is closed to effect appearance of the far end of the path on the display so that variation of the aircraft from the heading designated by the ILS equipment will effect a corresponding variation in the position control of the far end of the path in the manner previously described. It is, of course, possible to use the display in the ILS mode without engaging the compass engage switch 24 in which event the pilot would only fly the near end of the path.

In addition to providing a display of track and heading information in the ILS mode, the path width is adjusted to different widths to indicate the position of the aircraft relative to the glide slope. As shown in FIG. 2 and in more detail in FIG. 12, with movement of the mode switch to the ILS position, contacts MS6 are closed to connect the output of the ILS receiver unit 45 to a direct current amplifier 403 which amplifies the ILS signals indicating the amount of deviation of the aircraft above and below a predetermined glide slope. Amplifier 403 is similar in structure to amplifier 202 (FIG. 10). The signal output of amplifier 403 is connected over path 404 to the input circuit of a variable sawtooth generator 406. Variable sawtooth generator 406 may be one of any of a number of well-known commercial units in which variation of the direct current level input signal effects variation of the amplitude and polarity of the output sawtooth. One embodiment of a generator of this type is shown in the above-identified patent (sawtooth generator 74—FIG. 15), and as there shown, variation of the input direct current signal to grid 284 will result in a corresponding variation in the sawtooth output which appears at plate 281.

The variable amplitude sawtooth output of generator 406 is extended over mode switch contacts 64 and path 408 to input B on the flight path generator circuitry 18. In the embodiment of the flight path circuitry set forth in the above noted patent (FIG. 19), conductor 408 would be connected to the junction of resistances 528, 529.

In use, with deviation of the aircraft from the glide slope, an output signal is provided by glide slope receiver 45 over contacts MS6 to amplifier 403, which provides an amplified signal over conductor 404 to the input circuit for the variable sawtooth generator 406. The corresponding variation in the amplitude of the sawtooth as coupled over contacts 64 and conductor 408 to input B on flight path generator 18 to effect a corresponding variation in the width of the path which is generated for display on monitor 20) (see FIG. 9A-9C for example). If desired, such signal output may be used to adjust the position of the path apex relative to the horizon with changes in position of the aircraft relative to the glide slope.

The reference markers L, R shown in FIG. 9A-9C are generated by path altitude marker generator 71 which is a symbol generator similar to generator 310 (FIG. 11) and connected in a like manner, the resistor 373 being adjusted to narrow the width of the marker as shown, and potentiometer 349 being adjusted to move the marker to the position shown. Operation of mode switch 22 to the ILS position closes contacts 65' to energize the path altitude marker generator 71.

In some embodiments, in order to determine the desired center position of the path, it is useful to provide a marker which indicates the center of the raster in any condition of flight. In such event, another symbol generator such as 310 would be provided and the resistor 373 and potentiometer 349 would be adjusted by normal flight to position the marker in the center position.

AUTOMATIC DIRECTION FINDER (ADF) MODE

In yet another position of the mode switch 22, commercial ADF equipment is connected to the generator circuitry. In the ADF mode of operation, the system may be used for effecting bearing determination, homing position determination, and the like. In such mode of operation, the near end of the path is fixed in the display center, and only the position of the path apex or far end is displaced with changing conditions. In one use, for example, if the pilot wishes to home on a selected ADF station, the following steps would be taken: (a) the ADF receiver is tuned to the desired station and identified; (b) the mode select switch 22 is set to the ADF position—(at this time, the flight path 16 and symbol 190 will appear on the display—see FIG. 7C, for example, contact 72 on mode switch 22 being closed to disable the path far end blanking circuit 67'); (c) the select knob 423 (FIG. 13) on the top is adjusted to zero degrees reading; (d) the aircraft is turned until the apex of path 16 is aligned with the aircraft reticle symbol 19 and the to-from symbol 190 is in the "to" position. If the path apex is to the left of the reticle symbol 19, the pilot turns to the left. If the path apex is to the right of the reticle symbol 19, the pilot would turn the aircraft to the right. In this manner, the pilot may follow the flight path to the selected ADF station.

In a second mode of operation, the ADF equipment 44 would be used for bearing determination or position determination. In such manner of operation, the ADF receiver is tuned to the desired station and identified and the mode switch is operated to the ADF position. The outer select knob 423 (FIG. 13) on the ADF equipment (which is conventional) is then rotated until the far end of path 16 is aligned with the aircraft reticle symbol 19, and the to-from symbol 190 is in the "to" position. At such time, the outer select dial indicates the relative bearing to the station. The ADF signal derivation circuitry 44' for effecting such mode of operation is now set forth in detail.

With reference to FIG. 13, there is shown thereat a three-wire synchro 415 having input terminals 52-54 which are connected to the output of the ADF receiver 44 on the aircraft with closure of contacts MS7 by operation of mode switch 22 to the ADF position, and specifically to the conductors which supply a similar synchro unit in the operation of the needle indicator which now provides the ADF information to the pilot. As well known in the art, in the conventional ADF indicator when the ADF receiver is in operation, the needle points to the bearing of the station relative to the heading or the aircraft. Accordingly, the signals which appear on conductors 52, 53, 54 are indicative of the relative bearing of the station relative to the heading of the aircraft. Such signals are coupled to the primary winding of a three wire synchro 415 having a rotor 424, and also over conductors 426, 427, 428 to the primary winding of a second three wire synchro 429 having a rotor 432. Rotors 434 and 432 of the first and second synchros, respectively, are wound on a common shaft 423. As well known in the art, adjustment of the control shaft 423 will effect a corresponding adjustment of the output of the signals provided by the rotor windings 424, 432.

As shown in FIG. 13, a 400 cycle reference signal having an amplitude of approximately 5 volts is coupled over conductor 435 to one terminal of each of the rotors 424, 432, and the signal output of each of the synchros 415, 429 as modulated by the reference signal provided over conductor 435, is coupled over associated rectifiers 434, 436, respectively.

With reference first to the output of the rotor 424, it is noted that in one embodiment in which the rotor output varied between zero and five volts without the reference voltage, the signal output varies between 0 and 10 volts, the variation being a function of the difference between the heading of the aircraft and the heading to the station as indicated by the ADF equipment. The signal thus obtained is rectified by rectifier 434 and filtered by capacitor 433 to provide a direct current signal variable as a function of relative bearing over conductor 437 to the second section of differential amplifier 450 and also over a network comprising resistors 438 and 440 to output conductor 111.

As noted above, with the mode selection switch 22 in the ADF position, switch contacts MS4 (FIGS. 2 and 6) extend the output signal of the ADF signal derivation circuit 44' over conductor 109 to the input of differential amplifier 81 (FIG. 6) in the path far end control circuit 41. The positioning of the far end of the flight path 16 is effected in the manner set forth hereinabove with the coupling of signals from the gyro compass 40 to circuit 40'. Manifestly the pilot need only maneuver the aircraft to maintain the path apex at the reticle 19 to arrive at the selected ADF station.

With reference once more to the ADF signal derivation circuit 44' (FIG. 13) rotor 432 on the second three wire synchro is displaced 45 electrical degrees from the rotor 424. The voltage obtained from the rotor 432 by reason of the ADF input to the primary winding of synchro 429 is mixed with the 5 volt reference signal obtained over conductor 435 and rectified by the rectifier 436, filtered by capacitor 448 and coupled over conductor 449 to the first section of a differential amplifier 450. The amplitude of the voltage thus obtained varies as in the previous case between 0 and 10 volts. In a similar manner, the rectified output signal or the first rotor 424 is extended over conductor 437 to the second section of the differential amplifier 450, and the output voltages are compared for the purpose of obtaining a signal for coupling over conductor 452 and resistor 351 (FIG. 11) to the to-from indicator circuit to thereby effect positioning of the to-from symbol 190 in accordance with the condition of the aircraft relative to the selected station.

With reference to FIG. 13A, typical outputs of channels A and B are shown by the voltage chart referenced by letters A and B for the different relative rotational positions of the aircraft. With reference to curve B, it is apparent that there is a difference between the signals on channels A and B except at points C and D. At point X on the two curves, it is apparent that curve A will be at approximately 5 volts and curve B will be at approximately 1 volt. Alternatively at point Y, curve A will be at approximately 5 volts and curve B will be at approximately 9 volts. The signals provided by the rotors at these two positions X and Y are at a maximum value and of opposite polarity, and are therefore used to indicate the difference between a "to" and a "from" position of the readout being obtained. In one embodiment, the voltages between point X and point C are fed to differential amplifier 450 to indicate the "to" positions and the voltages between points C and D are fed to differential amplifier 450 to indicate the "from" condition.

The output signals of the two rotors may be altered by manually adjusting the rotor shaft 423, or alternatively changing the heading of the aircraft relative to the station. Assuming by way of example that the pilot tunes the ADF receiver to the desired station, and thereafter operates the course control knob 423 to zero. When the aircraft is on the heading to the station and the course control knob is set to this position, the electrical output of the channel A and channel B will be that shown at point X. With variation of the heading of the aircraft in relation to the bearing of the station the signal output of the two rotors 424, 432 will change to correspondingly different points on the chart (FIG. 13A).

The output of differential amplifier 450 is extended over conductor 452 to resistors 347 and 348 and differential amplifier 312 in the to-from indicator circuit (FIG. 11). The manner in which the indicator to-from symbol is moved to the various positions in accordance with these changing signals will be apparent from the description set forth hereinbefore in the matter of the operation of the circuitry shown in FIG. 11. In a further embodiment, with the switching of mode switch to the ADF position, additional synchros are provided to automatically place the course control knob in the zero position and a manual adjustment knob is not required. In yet another manner of flight operation using the ADF equipment, the pilot may ascertain the relative bearing of the station by maintaining the aircraft on its heading and rotating the course control knob until a path appears in the center position of the screen, and the to-from signal is moved to the "to" position. The pilot may then read the relative bearing on the dial of the course control knob.

FM MODE OF OPERATION

In the FM mode of operation, the output signal of the FM equipment 46' comprises a variable voltage signal which gives the pilot an indication of the variation of the heading of the aircraft from the heading toward the station. That is, if the aircraft goes to the left or the right of the heading to the station, the value of the output signal changes correspondingly. Accordingly, the FM signal derivation circuit 46' may be used in the manner heretofore described to control the far end of the flight path 16 in the manner set forth hereinbefore. Repetition of the circuitry for such manner of operation is not necessary.

In the FM mode of operation, the pilot sets the mode select switch 22 to the FM position, and the flight path will appear on the display monitor 20 with the near end fixed in the center of the screen. As hereinbefore, the position of the path apex will vary with changes in the aircraft heading relative to the station bearing. If the aircraft is on the proper heading, the path apex is aligned with the aircraft reticle symbol 19. If the path apex is to the left of the reticle symbol 19, the pilot turns left, and if it is to the right, the pilot turns to the right.

COURSE DIRECTOR SYSTEM

(Aircraft Stabilized)

The invention further sets forth a novel course director system which automatically programs the aircraft over a selected station, the path as displayed being such as to cause the pilot to automatically "crab" the plane by an amount necessary to compensate for drift caused by the wind, compass error and the like.

Briefly, assuming the pilot of an aircraft has selected a track to an omni station by means of associated omni receiver equipment, and has registered such bearing in the omni receiver, and further has maneuvered his aircraft to the heading which points the aircraft toward the station, it will be apparent that absent any crosswinds, error or the like, movement of the aircraft along such heading will advance the aircraft to and over the station. If, however, the wind is of sufficient force to cause the plane to drift to the right of the selected track, it will be apparent that if the pilot maintains the compass heading which was selected, the aircraft will ultimately pass to the right of the station.

As the aircraft is laterally displaced from the track in such manner, the relative bearing to the station detected by the omni receiver will change by a corresponding value, the degree of change of bearing increasing as the aircraft progresses closer to the station. Accordingly, in actual flight, as a drift to the right of a selected track is observed, the pilot will shift the aircraft heading to the left by an amount which his experience indicates will move the aircraft toward the original selected track while still progressing in the direction of the selected station. As the pilot draws closer to the track once more, the degree of angle of the aircraft heading to the track is reduced, a certain angle being maintained, however, to prevent lateral displacement from the selected track. Such flight correction in which the heading of the aircraft is offset relative to the compass heading to the selected destination to compensate for drift is known in the art as "crabbing." As will be shown, the novel course director system of the present disclosure automatically compensates for drift so that with a particular heading and track entered into the system, the flight path display will direct the pilot to follow an aircraft heading which results in automatic crabbing of the aircraft in such manner as to control the same to arrive directly over the desired destination.

With reference now to FIG. 14, there is shown thereat a block diagram of the circuitry which is utilized to provide such manner of operation. As illustrated, a first or compass control stage of the circuitry includes a directional gyro 460, which may be of the type commercially available from Aircraft Instrument Manufacturer, Model 516; a control transformer 462 which may be of the type which is commercially available from Kearfott Company, Model 11CT4, and a coupling or mixer transformer 464, which may be of the type available from Triad Manufacturing Company, Model T13X, and a rectifier circuit 468 which is connected to one input of a differential amplifier 81 which is of the type disclosed in FIG. 6. A 400 cycle, 6.3 volt alternating current source 466 is coupled to a directional gyro circuit 460 and mixer transformer 464.

Directional gyro 460 comprises a synchro control transmitter, which as is well known in the art, is continually operative to provide a signal which indicates the actual aircraft heading.

Control transformer 462 includes a selector dial 478 having an associated scale which is divided into 360 increments of 1° each to permit the pilot to select a desired compass heading. With such adjustment of dial 478 to a desired heading on the scale, a rotor 480 in transformer 462 (FIG. 15) which is rotated therewith provides an output signal with the mixer transformer 464 which comprises a 400 cycle signal, the amplitude of which varies as a function of the difference between the heading selected by dial 478 and the actual aircraft heading as determined by the directional gyro 460.

Briefly, if the actual aircraft heading determined by the directional gyro 460 is the same as the heading selected by the selector dial 478, the output of control transformer 462 to the mixer transformer 464 is zero. With a variation between the heading selected by dial 478 and the heading of the aircraft as determined by the directional gyro 460, an alternating current signal of correspondingly different amplitude is extended to the center tap of the secondary winding 484 of mixer transformer 464.

The primary winding of transformer 464 is connected to the output of a 6.3 volt, 400 cycle alternating current source 466, and accordingly the output which is obtained at the terminal ends of the secondary winding of transformer 464 comprises a variable alternating current voltage which varies in amplitude and polarity as a function of the output signal of the control transformer 462. The output signals thus obtained are transmitted over resistors 486, 490 respectively, and rectified by diodes 488 and 492 to provide a positive or negative direct current voltage as a function of the difference in degrees between the heading selected on the control transformer 462, and the heading of the aircraft as determined by directional gyro 460. Filter capacitors 496 filter out any 400 cycle current which appears at such point.

The rectified signal output is coupled to a first transistor 110 of differential amplifier 81 (FIG. 14) which amplifier is similar to the differential amplifier 81 shown in FIG. 6. The output of differential amplifier 81 is extended over an emitter-follower circuit 85 and an electronic potentiometer, such as 86, to a path sawtooth output circuit, such as 168, which is connected to point A on the flight path generator 18. Similar circuitry is also shown in FIG. 6.

The second stage of differential amplifier 81 (FIG. 14) is controlled by the signal output of the omni receiver 42. A signal derivation circuit 42', such as shown in FIG. 10, is connected to omni receiver 42, and an amplifier, such as amplifier 248 in FIG. 10 has its output connected over the switch contacts 471 on switch 470 to the second transistor 118 in differential amplifier 81.

It will be apparent from the earlier disclosure herein that the output signals of the omni receiver circuit 42 will comprise a direct current signal which varies in amplitude as a function of the deviation of the actual bearing of the aircraft from the station relative to the radial station bearing selected on the dial 479 of the omni receiver 42.

At this time, it will be noted that if the signal output of the compass signal derivation equipment (FIG. 15) over conductor 498 to transistor 110 in differential amplifier 81, and the signal output of the omni signal derivation equipment to transistor 118 in the differential amplifier 81 are both zero (or are both of an equal value), the output signal over conductor 168 to the flight path will be zero, and the path will be in the center position shown in FIG. 1. If the difference in the signals input to transistor 110 and 118 result in an output signal over conductor 168 which is of one polarity the far end of the path will be curved to the right, and if the output signal over conductor 168 is of the opposite polarity the far end of the path will be curved to the left (see FIGS. 8A, 8C, for example), the extent of displacement being related to the difference of the amplitude of the signal input to transistors 110, 118.

Figure 17:

With reference to FIGS. 17A and 17B, it will be initially assumed that the pilot has tuned omni receiver 42 to station 188 and has ascertained that the radial bearing to the station is 180°. A signal indicative of such bearing is transmitted by the omni signal derivation circuit 42′ (FIG. 14) over amplifier 248 to the second stage 118 of differential amplifier 81. Assuming further that the pilot wishes to fly along radial bearing 180° to station 188, it will be apparent (with reference to such FIG. 17) that the heading for the aircraft on such bearing would be 0° and the control dial 478 on control transformer 462 is therefore operated to 0°. The heading and bearing information are both automatically provided by the omni receiver.

If the airplane heading is 0°, there will be zero difference between the aircraft heading provided by gyro 460 and the heading selected by dial 478, a zero output will be coupled to the first transistor 110 of differential amplifier 81, and the output of the differential amplifier 81, as extended over emitter-follower 85, to the electronic potentiometer 86 will be zero. The output over conductor 168 to the flight path control circuit will also be zero, and the flight path will therefore be in its normal center position as shown in FIG. 17B.

Figure 17E:
Figure 17C:

Assuming now that as the aircraft advances along the course the pilot changes the heading of the aircraft, as shown for example in FIG. 17C, to approximately 345°, the directional gyro 460 will move to the new heading 345°, and a difference will occur between the heading on directional gyro 460 (345°) and the heading selected on control transformer 462 by selector dial 478 (0°). A differential signal proportional in amplitude to the difference and of a polarity related to the direction is thereupon extended over the first section 110 of differential amplifier 81, emitter-follower circuit 85, and electronic potentiometer 86 to conductor 168 and the far end of the flight path is shifted to the right as shown in FIG. 17D. Such indication will, of course, indicate to the pilot that the aircraft heading has deviated from the heading to the station, and should be maneuvered to the right to bring the aircraft back to the proper heading. Summarily, if the aircraft is on track, and only the aircraft heading is at variance with the selected heading, the system will control the path to indicate the nature and degree of the heading deviation to the pilot.

With reference now to FIG. 17E, the showing therein indicates that the aircraft has drifted to the right of the desired track, and it will be apparent therefrom that even though the pilot is on the selected heading, the drift is such that the aircraft will pass to the right of the station. As noted above, in the maneuvering of aircraft, and particularly the maneuvering of light aircraft, it is not unusual to experience drift of an aircraft from a selected track in such manner. As a result of such drift, the pilot would normally adjust the heading of this aircraft to be at an angle with the track sufficient to compensate for such drift, and thereby cause the aircraft to arrive over the desired station by flying a heading other than the apparent heading to the station. Such mode of operation is known in the art as crabbing, and the manner in which the novel aircraft stabilized course director of the present invention provides directive path information which automatically results in crabbing of the aircraft to follow the proper course is now set forth hereat.

With reference to FIG. 17E, it is seen that with the aircraft on such path, the heading of the aircraft is the same as the heading selected by the selector dial 478 on control transformer 462 (i.e., both 0°), and accordingly a zero error signal will be provided to the first section of differential amplifier 81.

However, as the result of the aircraft having drifted to the right of the selected radial beam or track (180° in the present example), the bearing detected by the omni receiver 42 from the aircraft to the station 188 will be in the order of 165°, and accordingly will be at variance with the radial beam selected by the control knob 479 on omni receiver 42 (FIG. 14). As a result of such difference, a direct current signal having an amplitude related in value to the degree of difference in the bearing and a polarity related to the direction, is transmitted over contacts 471 to the second transistor 118 of differential amplifier 81, and the difference output of amplifier 81 is transmitted over emitter-follower 85 and electronic potentiometer 86 to flight path 168, whereby a sawtooth output having an amplitude and direction relating to the deviation are coupled to the flight path generator 18 to provide a display such as shown in FIG. 17F. As there shown, with such manner of display wherein the far end of the path is displaced to the left, and the pilot is directed to maneuver his aircraft to the left to bring the path apex back into registration with the center reticle 19.

However, as the pilot now turns the aircraft to the left (FIG. 17G) a resultant difference occurs between the heading of the aircraft as provided by the directional gyro 460 (approximately 345° as shown) and the heading selected by the selector dial 478 (0°), and accordingly a signal depending upon the value of the turn executed at this time is transmitted to the first stage 110 of differential amplifier 81. As the pilot maneuvers sufficiently to the left, the value of the signal is sufficient to balance out the signal coupled to the second stage 118 by the omni equipment, the resultant output of differential amplifier 118 will be zero, and the path is once more moved to the center position shown in FIG. 17H even though the aircraft as shown in FIG. 17G is to the right of the selected path and on a heading which would appear to direct the aircraft to the right of the station in the absence of drift, etc.

Assuming that such correction as was made in reading the position shown in FIG. 17G was correct for the particular drift which is occurring, the showing of FIG. 17H will be maintained as the plane progresses toward the selected station 188 and the aircraft will pass directly over the station 188. The circuitry thus operates as comparator means to determine the heading changes necessary to compensate for drift from a track in order to bring the plane into position over the desired station 188.

An illustrated showing in FIG. 16 sets forth a pictorial representation of the manner in which the computation is automatically provided by the system, and the manner in which the flight path is adjusted to direct the pilot to a heading which automatically compensates for the drift.

Assuming, as in the example of FIG. 17A, that the pilot has (a) operated his omni receiver 42 and has determined that the radial bearing to the desired station 188 is 180°, (b) has set omni control knob 479 (FIG. 14) to such value, (c) has adjusted his selector dial 478 to heading 0°, and (d) has maneuvered the aircraft to a heading of 0° so that directional gyro 460 reads the same value as that selected by the selector dial 478. The flight path display provided will then be as shown on FIG. 17B.

Assuming, further, that as the pilot proceeds along the track illustrated in FIG. 16, a wind coming from the left displaces the aircraft to the right of the selected track to station 188. As the aircraft drifts to the right, the relative bearing to station 188 will change, and omni equipment 42 (FIG. 16) operates in known manner and detects such change and provides an error signal to the differential amplifier 81 (FIG. 14). Assuming the pilot has not as yet changed the heading of his aircraft, the heading provided by the directional gyro 460 and control transformer 462 will still be the same, and zero signal is provided to the right hand stage of differential amplifier 81. As a result of the error signal provided by the omni receiver 42 (off track) the end of the path will be adjusted laterally along the horizon to the left (see FIG. 17F for example).

The pilot therefore maneuvers the aircraft to the left (see the second aircraft symbol from the bottom—FIG. 16), and as the aircraft is turned to the left the heading of the gyro 460 will differ from the heading selected by selector dial 478 and an error signal is provided by such elements to the first stage 110 of the differential amplifier 81. As the aircraft turn to the left increases, the difference signal output of the gyro 460 and transformer 462 to the amplifier 110 in differential amplifier 81 increases. Since such signal is in effect balancing out the error signal provided the omni device, the output signal of the differential amplifier 81 to the flight path generator decreases and the end of the path moves in the direction of the center position.

At such time a balance occurs between the error signal provided by the omni equipment 42 and the error signal provided by the heading means 460, 462, the path will once more be centered as shown in FIG. 17B. However, at this time the aircraft is in the position represented by the second symbol from the bottom (FIG. 16) from whence it will be apparent that the aircraft has been automatically crabbed to compensate for the drift conditions.

With continued progress towards the station, the equipment continues to provide the difference signals to the flight path generator, and a typical path which will be followed in such mode of operation is shown in FIG. 16. As shown, the amount of crab is fairly constant for such progress, the aircraft tending to drift slowly and the compensation being of a smaller value at greater distances. As the aircraft approaches closer to the station the omni error signal becomes larger, and the resultant error signals fed into the flight path direct the pilot to increase the correction as indicated by the upper symbols shown in FIG. 16. The end result is to direct movement of the aircraft over a selected station by computing and indicating the necessary compensations for variable factors normally contained in the field.

It will be apparent to parties skilled in the art that the system may also be used to direct the aircraft into position relative to a desired radial bearing approach to a station. Assuming, for example, that the pilot is in the position shown in FIG. 17E relative to a desired track and that the pilot desires to approach station 188 along the illustrated radial bearing. The pilot will initially operate dial 479 on omni receiver 472 to dial in the radial bearing (180° for the illustrated track), and will set the bearing heading (0°) into his compass equipment by operating dial 478 on control transformer 462. If desired, means may be provided to mechanically link the two dials 479 and 478 so that only one adjustment is required.

As a result of such operation, the resultant signals which are obtained from the omni and compass equipment will cause a display, such as shown in FIG. 17F, to appear which will direct the pilot to turn his aircraft to the left until such time as the flight path straightens out as shown in FIG. 17H. As in the case described above, the continuing compensation of the equipment will result in a tangential approach to the desired track which will eventually bring the aircraft over station 188.

Operation of switch 470 to the ground position 472 permits use of the circuitry in the compass mode described hereinabove.

In yet another embodiment, the to/from symbol shown in FIG. 8A and provided by the circuitry of FIG. 11, may be utilized with the system to provide an indication to the pilot of the crabbing position of the aircraft. Thus, as shown in FIG. 18, with the aircraft crabbed to the proper compensating heading (FIG. 17G, for example) the to/from symbol as shown in FIG. 19 would indicate to the pilot that the plane heading is directed to the left of the station and the central position of the path apex indicates that the proper compensation is provided to bring the aircraft directly over such station. The to/from symbol thus provides information of the relative position of the station and the aircraft, as well as the amount of compensation which is being used.

While the foregoing description as set forth referred to the use of the novel course director system with the display in the omni mode of operation, it will be readily apparent that the system may also be readily utilized with the ILS equipment. In such use, the heading information which is dialed into the compass would be that of the desired runway.

It is further apparent that although the illustration set forth herein is concerned with aircraft, the equipment has similar use in other applications including ships, boats, space equipment, and the like which may desirably follow a selected track and which are subject to variable conditions such as air currents, water currents, and other similar deviating factors.

Further although the foregoing embodiments as disclosed are specifically directed to the presentation of real world conditions, it is readily apparent that the path, and horizon provide two reference members, the path (and particularly the path far end) being in the nature of a pointer marker which is adjusted to different positions along a horizontal line from a zero position to successive positions to provide different directional information. Manifestly the horizontal line would be marked in degrees if desired to provide a numerical indication, as well as directive information.

While what is described is regarded to be a preferred embodiment of the invention, it will be apparent that variations, rearrangements, modifications and changes may be made therein without departing from the scope of the present invention as defined by the appended claims.

What is claimed is:

1. In a display system for a mobile unit, display means, a path generator circuit for generating signals which provide a path on said display means including control means for varying the characteristics of the path displayed, a first signal circuit for providing information signals representative of deviations of heading of the unit relative to a predetermined selected heading including a signal generator circuit for providing an output signal which varies in amplitude and polarity to represent said deviation comprising a first and a second electronic potentiometer circuit, each of which varies the resistance of a first and a second circuit in accordance with the extent and direction of the deviation, means for coupling a negative sawtooth to said first potentiometer circuit at a given rate, and means for coupling a positive sawtooth to said second potentiometer circuit at said given rate and in phase with said negative sawtooth, and summing means for providing a summated signal output of said first and second potentiometer circuits.

2. In a display system for an aircraft including directional receiver means on said aircraft, display means, a path generator circuit for generating signals which provide a path on said display means having an apex and a base end including control means for varying only the position of the path apex on said display, a fixedly positioned reference mark located on said display means for said path apex, a signal derivation circuit for providing information signals representative of deviation of the heading of the aircraft from the bearing of a station selected by said directional receiver means, and means for coupling the output of said signal derivation circuit to said control means in said path generator circuit to correspondingly vary the position of the path apex relative to said reference mark without displacing the base end of said path.

3. A system as set forth in claim 2 which includes circuit means for generating a symbol display which identifies the bearing, at times, as the bearing to a station, and at other times as the bearing from a station.

4. A system as set forth in claim 2 which includes means for providing a further visual signal on said display means responsive to movement of said aircraft into a predetermined relative position with said station.

5. A display system as set forth in claim 2 which includes a further signal derivation circuit for providing information signals representative of the deviation of the aircraft relative to a selected track, and means for coupling the output of said further signal derivation circuit to said control means to laterally adjust the position of the path base end on the display to a correspondingly different position.

6. In a display system for a mobile unit having means including a directional receiver means for selecting an associated station including means for providing signals representing the ground track to said selected station and variations from said track, display means comprising a cathode ray tube having a display area, marker generator means for generating waveform signals which provide a pointer-marker having a first and second end on said display area including control means for modifying said waveform signals to adjust the location of only one end of said marker on said display area without displacing the other end and for independently adjusting only said other end to provide an indication of the deviation from a selected heading, signal derivation means for providing information signals representative of the deviation of the mobile unit relative to the track to the selected station indicated by said receiver means, at least one immovable reference symbol fixedly positioned at a predetermined position on said display means for simultaneous viewing with and referencing by said marker, means for coupling the output of said signal derivation means to said control means in said marker generator circuit to laterally vary the location of only one end of the marker on said display area relative to said fixed reference symbol to indicate the location of the mobile unit track relative to the selected track to said station, and means for providing signals representative of heading deviation to said control means to effect lateral adjustment of only said other end of said marker relative to said fixed reference symbol to represent the heading deviation.

7. A display system as set forth in claim 6 which includes symbol generator means for generating further waveform signals to provide at least one additional symbol on said display means, and means for controlling movement of said symbol to different positions on the display area to indicate the track as toward or from the selected station.

8. In a display system for an aircraft having localizer receiver means for selecting a localizer station, display means, a predetermined fixedly positioned reference symbol on said display, path generator means for generating waveform signals which provide a path on said display means with the apex of said path at said reference symbol including control means for varying the shape of the waveform to vary the position of the path base, the position of the path apex and the path width, a first means controlled by said localizer receiver means to provide signals representative of the position of the aircraft relative to a given track to a selected localizer station, a second means including means on said aircraft for selecting the heading to said station, means for providing signals representative of the heading of the aircraft relative to said selected heading, a third means for providing signals representative of the position of the aircraft relative to a glide slope provided by the selected localizer station, and means for coupling the output of said first, said second and said third means to said control means in said path generator circuit to effect the corresponding variation of the position of the path base, the path apex and the path width.

9. In a display system for a mobile unit having display means, sensor means for providing signals relating to at least one of the attitudes of the mobile unit, a path generator circuit for generating signals which provide a path symbol on said display means including control means for varying the path display with receipt of different signals from said sensor means, blanking means for blanking at least a portion of said path symbol from said display, and circuit means for disabling said blanking means only during periods in which signals are provided by said sensor means to said control means.

10. In a display system for a mobile unit having electronic display means comprising a cathode ray tube having a display area, an electron beam and deflection means for said electron beam, a fixedly positioned reference symbol, path generator means for generating signals for said cathode ray tube deflection means to provide a path on said display area having an apex including control means for applying signals to said deflection means to vary the position of the path on said display area, first means for providing signals representing deviation of the unit from a selected track, second means for providing signals representing deviation of the heading of the unit from a selected heading, third means responsive to the output of said first and second means continually providing the heading required to operate said mobile unit in a compensatory crabbing mode to the selected destination, and output means for transmitting the output of said third means to said control means for the path generator means to vary the lateral position of the path apex on said display relative to said fixed reference symbol and thereby the heading to be followed to effect the proper crab attitude.

11. A system as set forth in claim 10 in which said first means comprises a directional gyro for providing signals indicating the actual heading of the unit, a control transformer having a selector dial for use in selecting the desired heading of the unit, and means for providing output signals having an amplitude which varies as a function of the difference between the heading selected and the actual heading of the unit.

12. A system as set forth in claim 10 in which said third means comprises a differential amplifier stage having first and second inputs and in which the output of said first means is connected to one of said inputs, and the output of said second means is connected to the second one of said inputs, and means connected to the output of said differential amplifier for providing signals of variable amplitude and polarity to said output means.

13. A system as set forth in claim 12 in which the last means includes means for providing sawtooth signals of different polarity and amplitude to said output means which represent the direction and amount of deviation of the heading selected and the actual heading of the unit.

14. In a display system for a mobile unit having compass means, display means comprising a cathode ray tube having a display area, means for generating a horizon line, signal generator circuit means for generating waveform signals which electronically generate a heading marker symbol on the display area of said cathode ray tube display means for reference with a predetermined position on said waveform line when said unit is on a desired path including control means for varying the display position of the one end of the marker symbol to different position along said horizon line, means for selecting a given compass heading, compass signal derivation circuit means for providing signals representative of deviations of the heading of the mobile unit from the selected heading, and means including heading marker control means for coupling the signal output of said compass derivation means to said control means in said generator circuit, said control means being operative to vary the location of said one end of the marker symbol along said line relative to said predetermined position in accordance with the variance of the unit heading relative to said selected compass heading.

15. (In lieu of previous claim 21) In a display system for providing directional information relative to a selected station; cathode ray tube display means including raster generator means, a first symbol generator means for providing signals which produce a first symbol on the raster which presents directional information on the display for said device, and to-from circuit means including input means connected to said directional means over which a first signal is received whenever said mobile unit is proceeding toward a selected location, and a second signal is received whenever said mobile unit is directed away from said selected location, a second symbol generator means for generating a second symbol on said display means including first means for generating a first pulse set at the vertical rate of the raster, and second means for generating horizontal pulses at the horizontal rate of the raster, and means for generating symbol display signals only during the coincident time period of said first and second pulses in a raster trace, and symbol positioning means connected to said input means responsive to said first and second signals to enable said second symbol generator to position said second symbol at correspondingly different positions on said display means relative to a predetermined position which represents the selected location.

16. A system as set forth in claim 15 in which said symbol positioning means is operative responsive to said first and second signals from said input means to provide enabling signals which control the time of generation of said first pulse by said first means at correspondingly different times in the raster trace, to thereby adjust the vertical position of the second symbol on said display.

17. A system as set forth in claim 15 which includes signal derivation means connected to said first symbol generator means for providing signals to said second means to control the time of generation of said horizontal pulses in each line trace of the raster to thereby adjust the lateral position of the second symbol on said display means.

18. (In lieu of previous claim 24) In a display system for a mobile unit which has directional means for providing directional information relative to a selected location; cathode ray tube display means including raster generator means, a first symbol generator means for providing signals which produce a first symbol on the raster which presents directional information on the display for said device, to-from circuit means including input means connected to said directional means over which a first signal is received whenever said mobile unit is proceeding toward a selected location, and a second signal is received whenever said mobile unit is directed away from said selected location, a second symbol generator means for generating a second symbol on said display means, symbol positioning means connected to said input means responsive to said first and second signals to enable said second symbol generator means to position said second symbol at correspondingly different positions on said display means relative to a predetermined position which represents the selected location, and blinker circuit means including detection means connected to said symbol positioning means to detect movement of the mobile unit over the selected location, a timing circuit enabled responsive to detection of said position by said detection means to provide a series of timing signals, and means for coupling said timing signals to said symbol generator means to vary the size of the second symbol at a predetermined rate to thereby provide the appearance of a blinking symbol while said mobile unit is over the selected location.

* * * * *